(12) United States Patent
Cook

(10) Patent No.: US 12,385,764 B2
(45) Date of Patent: Aug. 12, 2025

(54) ABSOLUTE POSITION ENCODER UTILIZING SINGLE TRACK CONFIGURATION

(71) Applicant: Mitutoyo Corporation, Kanagawa-ken (JP)

(72) Inventor: Ted Staton Cook, Kirkland, WA (US)

(73) Assignee: MITUTOYO CORPORATION, Kanagawa-ken (JP)

( * ) Notice: Subject to any disclaimer, the term of this patent is extended or adjusted under 35 U.S.C. 154(b) by 154 days.

(21) Appl. No.: 18/148,968

(22) Filed: Dec. 30, 2022

(65) Prior Publication Data

US 2024/0219208 A1    Jul. 4, 2024

(51) Int. Cl.
*G01D 5/22*    (2006.01)

(52) U.S. Cl.
CPC ..................... *G01D 5/22* (2013.01)

(58) Field of Classification Search
CPC ....................................................... G01D 5/22
See application file for complete search history.

(56) References Cited

U.S. PATENT DOCUMENTS

| | | | |
|---|---|---|---|
| 5,104,225 A | 4/1992 | Masreliez | |
| 5,563,408 A * | 10/1996 | Matsumoto | G01D 5/2492 250/237 G |
| 5,576,537 A | 11/1996 | Holzapfel et al. | |
| 5,841,274 A | 11/1998 | Masreliez et al. | |
| 5,886,519 A | 3/1999 | Masreliez et al. | |
| 5,894,678 A | 4/1999 | Masreliez et al. | |
| 5,901,458 A | 5/1999 | Andermo et al. | |
| 5,936,399 A | 8/1999 | Andermo et al. | |
| 5,973,494 A | 10/1999 | Masreliez et al. | |
| 5,998,990 A | 12/1999 | Andermo et al. | |

(Continued)

FOREIGN PATENT DOCUMENTS

| CN | 1272620 A | 11/2000 |
|---|---|---|
| CN | 1441226 A | 9/2003 |

(Continued)

OTHER PUBLICATIONS

Cook, "Transmitter and Receiver Configuration for Inductive Position Encoder," U.S. Appl. No. 16/826,842, filed Mar. 23, 2020, 77 pages.

*Primary Examiner* — Akm Zakaria
(74) *Attorney, Agent, or Firm* — Seed IP Law Group LLP

(57) ABSTRACT

An inductive type absolute electronic position encoder utilizing a single track configuration is provided. The encoder includes a scale portion and a detector portion configured to move relative to each other along a measuring axis direction. The scale portion includes a first scale element portion and a second scale element portion. The detector portion includes a field generating portion configured to generate changing magnetic flux, and a sensing portion including a first sensing element portion configured to operate with the first scale element portion and a second sensing element portion configured to operate with the second scale element portion. The detector portion and the scale portion are arranged in a single track configuration in which the first and second scale element portions are stacked relative to one another and the first and second sensing element portions are at least one of stacked or interleaved relative to one another.

23 Claims, 16 Drawing Sheets

(56) References Cited

U.S. PATENT DOCUMENTS

| | | | |
|---|---|---|---|
| 6,002,250 | A | 12/1999 | Masreliez et al. |
| 6,005,387 | A | 12/1999 | Andermo et al. |
| 6,011,389 | A | 1/2000 | Masreliez et al. |
| 6,049,204 | A | 4/2000 | Andermo et al. |
| 6,054,851 | A | 4/2000 | Masreliez et al. |
| 6,124,708 | A | 9/2000 | Dames |
| 6,157,188 | A | 12/2000 | Steinke |
| 6,259,249 | B1 | 7/2001 | Miyata |
| 6,271,661 | B2 | 8/2001 | Andermo et al. |
| 6,329,813 | B1 | 12/2001 | Andermo |
| RE37,490 | E | 1/2002 | Andermo et al. |
| 6,335,618 | B1 | 1/2002 | Nahum |
| 6,400,138 | B1 | 6/2002 | Andermo |
| 6,522,128 | B1 | 2/2003 | Ely et al. |
| 6,522,129 | B2 | 2/2003 | Miyata et al. |
| 6,531,866 | B2 | 3/2003 | Miyata et al. |
| 6,545,461 | B1 | 4/2003 | Miyata |
| 6,573,707 | B2 | 6/2003 | Kiriyama et al. |
| 6,628,115 | B2 | 9/2003 | Sasaki et al. |
| 6,646,433 | B2 | 11/2003 | Milvich |
| 6,646,434 | B2 | 11/2003 | Miyata et al. |
| 6,664,535 | B1 | 12/2003 | Nahum et al. |
| 6,714,004 | B2 | 3/2004 | Jagiella |
| 6,720,760 | B2 | 4/2004 | Milvich |
| 6,781,694 | B2 | 8/2004 | Nahum et al. |
| 6,867,412 | B2 | 3/2005 | Patzwald et al. |
| 7,015,687 | B2 | 3/2006 | Meyer |
| 7,126,495 | B2 | 10/2006 | Netzer |
| 7,196,510 | B2 | 3/2007 | Kawatoko |
| 7,239,130 | B1 | 7/2007 | Milvich |
| 7,307,736 | B2 | 12/2007 | Tobiason et al. |
| 7,530,177 | B1 | 5/2009 | Meichle et al. |
| 7,589,314 | B2 * | 9/2009 | Oka .................. G01D 5/38 |
| | | | 359/441 |
| 7,608,813 | B1 | 10/2009 | Milvich et al. |
| 7,652,469 | B2 | 1/2010 | Meyer |
| 7,705,585 | B2 | 4/2010 | Howard |
| 7,906,958 | B2 | 3/2011 | Nakayama et al. |
| 8,094,323 | B2 | 1/2012 | Kapner |
| 8,222,891 | B2 | 7/2012 | Steinke et al. |
| 8,309,906 | B2 | 11/2012 | Kapner et al. |
| 8,847,583 | B2 | 9/2014 | Sasaki et al. |
| 8,928,311 | B2 | 1/2015 | Sasaki |
| 9,018,578 | B2 | 4/2015 | Tobiason et al. |
| 9,121,733 | B2 | 9/2015 | Asano |
| 9,127,967 | B2 | 9/2015 | Nagura |
| 9,228,823 | B2 | 1/2016 | Fontanet et al. |
| 9,267,819 | B2 | 2/2016 | Cook |
| 9,383,184 | B2 | 7/2016 | Tiemann et al. |
| 9,435,663 | B2 | 9/2016 | Cook |
| D774,928 | S | 12/2016 | Matsumiya et al. |
| 9,612,136 | B1 | 4/2017 | Cook |
| 9,618,366 | B2 | 4/2017 | Nahum |
| 9,678,701 | B2 | 6/2017 | Cook |
| 9,772,202 | B1 | 9/2017 | Cook |
| 9,778,072 | B1 | 10/2017 | Nahum |
| 9,833,802 | B2 | 12/2017 | Kalistaja et al. |
| 9,835,473 | B2 | 12/2017 | Nahum |
| 9,958,294 | B2 | 5/2018 | Cook |
| 10,302,466 | B2 | 5/2019 | Tobiason et al. |
| 10,422,666 | B2 | 9/2019 | Cook |
| 10,520,335 | B2 | 12/2019 | Cook |
| 10,551,217 | B2 | 2/2020 | Cook |
| 10,591,316 | B2 | 3/2020 | Cook |
| 10,612,943 | B2 | 4/2020 | Cook |
| 10,775,199 | B2 | 9/2020 | Cook |
| 11,067,414 | B1 | 7/2021 | Cook |
| 2001/0003422 | A1 | 6/2001 | Andermo et al. |
| 2001/0020846 | A1 | 9/2001 | Miyata |
| 2002/0030484 | A1 | 3/2002 | Kiriyama et al. |
| 2002/0030485 | A1 | 3/2002 | Gleixner |
| 2003/0090264 | A1 | 5/2003 | Milvich |
| 2003/0128028 | A1 | 7/2003 | Jordil |
| 2003/0160608 | A1 | 8/2003 | Milvich |
| 2006/0103376 | A1 * | 5/2006 | Ma .................. G01D 5/145 |
| | | | 324/207.21 |
| 2009/0119940 | A1 | 5/2009 | Meichle et al. |
| 2011/0254541 | A1 | 10/2011 | Sasaki |
| 2012/0007591 | A1 | 1/2012 | Howard et al. |
| 2014/0184202 | A1 | 7/2014 | Horiguchi et al. |
| 2015/0375246 | A1 | 12/2015 | Kalistaja et al. |
| 2016/0054154 | A1 | 2/2016 | Cook |
| 2016/0146636 | A1 | 5/2016 | Nahum |
| 2016/0363638 | A1 * | 12/2016 | Daubert .............. G01D 5/145 |
| 2017/0089738 | A1 | 3/2017 | Cook |
| 2017/0268905 | A1 | 9/2017 | Nahum |
| 2017/0268906 | A1 | 9/2017 | Nahum |
| 2018/0003524 | A1 | 1/2018 | Cook |
| 2018/0058883 | A1 | 3/2018 | Cook |
| 2018/0087928 | A1 | 3/2018 | Jones |
| 2018/0113004 | A1 | 4/2018 | Cook |
| 2018/0180452 | A1 | 6/2018 | Cook |
| 2018/0195880 | A1 | 7/2018 | Cook |
| 2019/0041236 | A1 * | 2/2019 | Nikic .............. G01R 33/3642 |
| 2019/0120660 | A1 | 4/2019 | Hitchman et al. |
| 2019/0301895 | A1 | 10/2019 | Cook |
| 2020/0003581 | A1 | 1/2020 | Cook et al. |
| 2020/0003583 | A1 | 1/2020 | Cook |
| 2021/0103014 | A1 * | 4/2021 | Schroers ........... G01R 33/0283 |
| 2021/0341312 | A1 * | 11/2021 | Lange ................ G01B 7/003 |
| 2022/0205814 | A1 | 6/2022 | Cook |
| 2023/0366702 | A1 * | 11/2023 | Pirkl ................ G01D 5/2454 |

FOREIGN PATENT DOCUMENTS

| | | | |
|---|---|---|---|
| CN | 105415882 | A | 3/2016 |
| EP | 1014041 | A1 | 6/2000 |
| JP | 2018004628 | A | 1/2018 |
| JP | 2018031777 | A | 3/2018 |
| JP | 2018105854 | A | 7/2018 |

* cited by examiner

ABSOLUTE POSITION ENCODER UTILIZING SINGLE TRACK CONFIGURATION

BACKGROUND

Technical Field

This disclosure relates to metrology and, more particularly, to inductive position encoders that may be utilized in precision metrology systems.

Description of the Related Art

Various encoder configurations may include various types of optical, capacitive, magnetic, inductive, movement and/or position transducers. These transducers use various geometric configurations of a transmitter and a receiver in a detector portion (e.g., as included in a read head) to measure movement between the detector portion and a scale. U.S. Pat. No. 6,011,389 (the '389 patent) and U.S. Pat. No. 6,124,708 (the '708 patent) describe induced current position transducers usable in high accuracy applications; U.S. Pat. No. 5,973,494 (the '494 patent) and U.S. Pat. No. 6,002,250 (the '250 patent) describe incremental position inductive calipers and linear scales, including signal generating and processing circuits; and U.S. Pat. No. 5,886,519 (the '519 patent), U.S. Pat. No. 5,841,274 (the '274 patent), and U.S. Pat. No. 5,894,678 (the '678 patent) describe absolute position inductive calipers and electronic tape measures using an induced current transducer. U.S. Pat. No. 10,520,335 (the '335 patent), U.S. Pat. No. 10,612,943 (the '943 patent) and U.S. Pat. No. 10,775,199 (the '199 patent) disclose winding configuration refinements that are useful for enhancing the accuracy, robustness, and ease of alignment of inductive position encoders. All of the foregoing are hereby incorporated herein by reference in their entireties. As described in these patents, an induced current transducer may be manufactured using printed circuit board technology and is largely immune to contamination. However, such systems may be limited in their ability to provide certain combinations of features desired by users, such as combinations of compact size, high resolution, accuracy, low cost, robustness to contamination, etc. Configurations of encoders that provide improved combinations of such features would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In prior systems, certain absolute (ABS) electronic position encoders may utilize 2 or more encoder tracks to provide absolute positioning (i.e., every position has a unique combination of signals). ABS encoding is more robust than incremental (INC) encoding (e.g., which counts increments while moving) and therefore more desirable (e.g., can tolerate power cycle without losing position). However, ABS usually requires a larger footprint because the tracks are side-by-side. In accordance with principles as disclosed herein, an ABS solution utilizing a single track configuration (STC) may be achieved (e.g., as may be highly desirable for miniaturization, etc.).

An electronic position encoder is provided which is configured to measure an absolute relative position between a detector portion and a scale portion along a measuring axis direction. The electronic position encoder includes a scale portion extending along the measuring axis direction and a detector portion configured to be mounted proximate to the scale portion and to move relative to the scale portion along the measuring axis direction.

The scale portion includes a first scale element portion comprising first signal modulating scale elements, and a second scale element portion comprising second signal modulating scale elements.

The detector portion includes a field generating portion configured to generate changing magnetic flux in response to drive signals, and a sensing portion. The sensing portion includes a first sensing element portion comprising a first set of first sensing elements configured to operate in conjunction with first signal modulating scale elements of the first scale element portion, and a second sensing element portion comprising a first set of second sensing elements configured to operate in conjunction with second signal modulating scale elements of the second scale element portion.

The detector portion and the scale portion are arranged in a single track configuration in which the first and second scale element portions are stacked relative to one another and the first and second sensing element portions are at least one of stacked or interleaved relative to one another.

According to another aspect, a method is provided for operating the electronic position encoder configured to measure an absolute relative position between a detector portion and a scale portion along a measuring axis direction. The method includes: providing drive signals to cause the field generating portion to generate changing magnetic flux; and receiving detector signals from the detector portion. The detector signals include detector signals from the first set of first sensing elements that operate in conjunction with first signal modulating scale elements, and detector signals from the first set of second sensing elements that operate in conjunction with second signal modulating scale elements. The detector portion and the scale portion are arranged in a single track configuration in which the first and second scale element portions are stacked relative to one another and the first and second sensing element portions are at least one of stacked or interleaved relative to one another.

According to a further aspect, a system is provided (e.g., including components similar or identical to those of the electronic position encoder) which is configured to measure an absolute relative position between a detector portion and a scale portion along a measuring axis direction. The system includes the detector portion and the scale portion which are arranged in a single track configuration in which the first and second scale element portions are stacked relative to one another and the first and second sensing element portions are at least one of stacked or interleaved relative to one another. The system is configured to: provide drive signals to cause the field generating portion to generate changing magnetic flux; and receive detector signals from the detector portion. The detector signals include detector signals from the first set of first sensing elements that operate in conjunction with first signal modulating scale elements, and detector signals from the first set of second sensing elements that operate in conjunction with second signal modulating scale elements.

DETAILED DESCRIPTION

Figure 1:
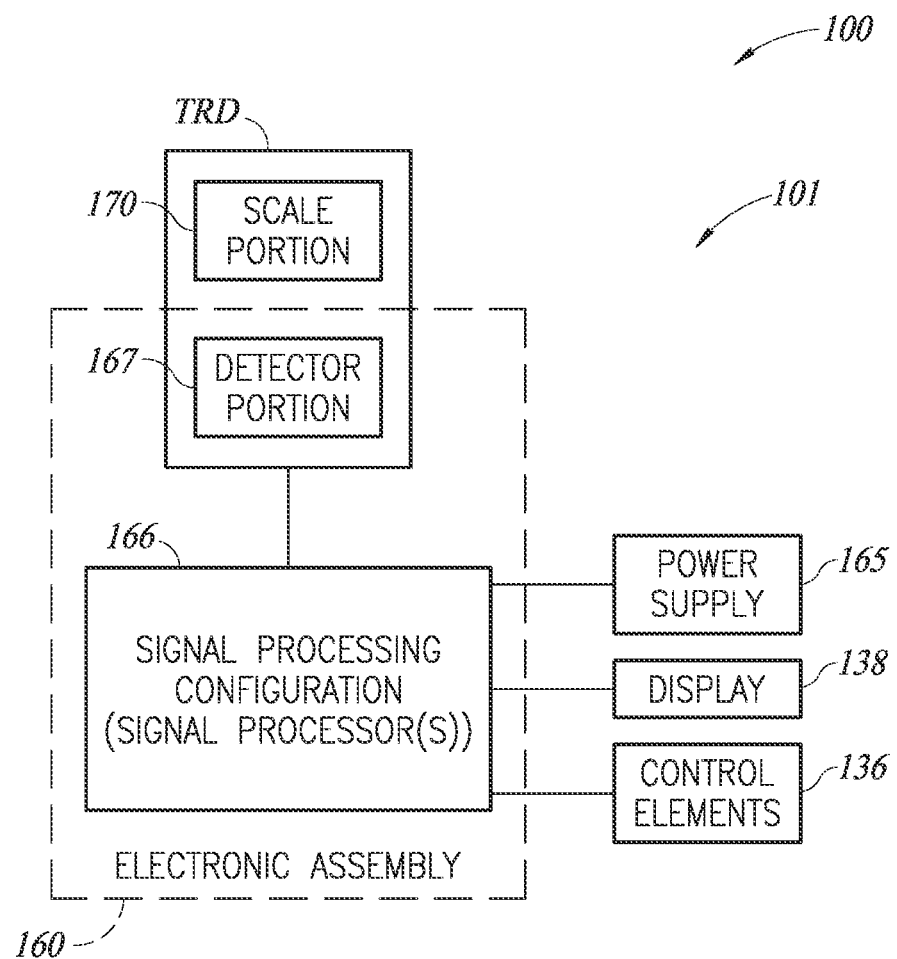
FIG. 1 is a diagram of a metrology system including an inductive electronic position encoder with a transducer including a detector portion and a scale portion.

FIG. 1 is a block diagram of exemplary components of a metrology system 100 including an electronic absolute position encoder 101. In various implementations, the electronic absolute position encoder 101 includes a scale portion 170 and a detector portion 167, which together form a transducer TDR. The electronic absolute position encoder 101 includes suitable user interface features such as a display 138 and/or user-operable control elements 136 (e.g., switches, buttons, etc.) In some implementations, the electronic absolute position encoder 101 may be used as part of a wireless-only device or other configuration, without the encoder 101 including a display (e.g., such as the system 100 including a corresponding remote display, etc.) The encoder 101 may additionally include a power supply 165.

All of these elements of the encoder 101 are coupled to a signal processing configuration 166 (e.g., including one or more signal processors), which in various implementations may be embodied as a signal processing and display electronic circuit in integrated circuit (IC) chip(s). The signal processing configuration 166 receives detector signals from the detector portion 167 and processes the detector signals to determine an absolute position of the detector portion 167 along the scale portion 170. It will be appreciated that the signal processing configuration 166 may comprise any combination of signal processing and physical circuitry. In various implementations, the signal processing configuration 166 and the detector portion 167 may be included as part of an electronic assembly 160 (e.g., as arranged on a substrate, etc.)

Figure 2:
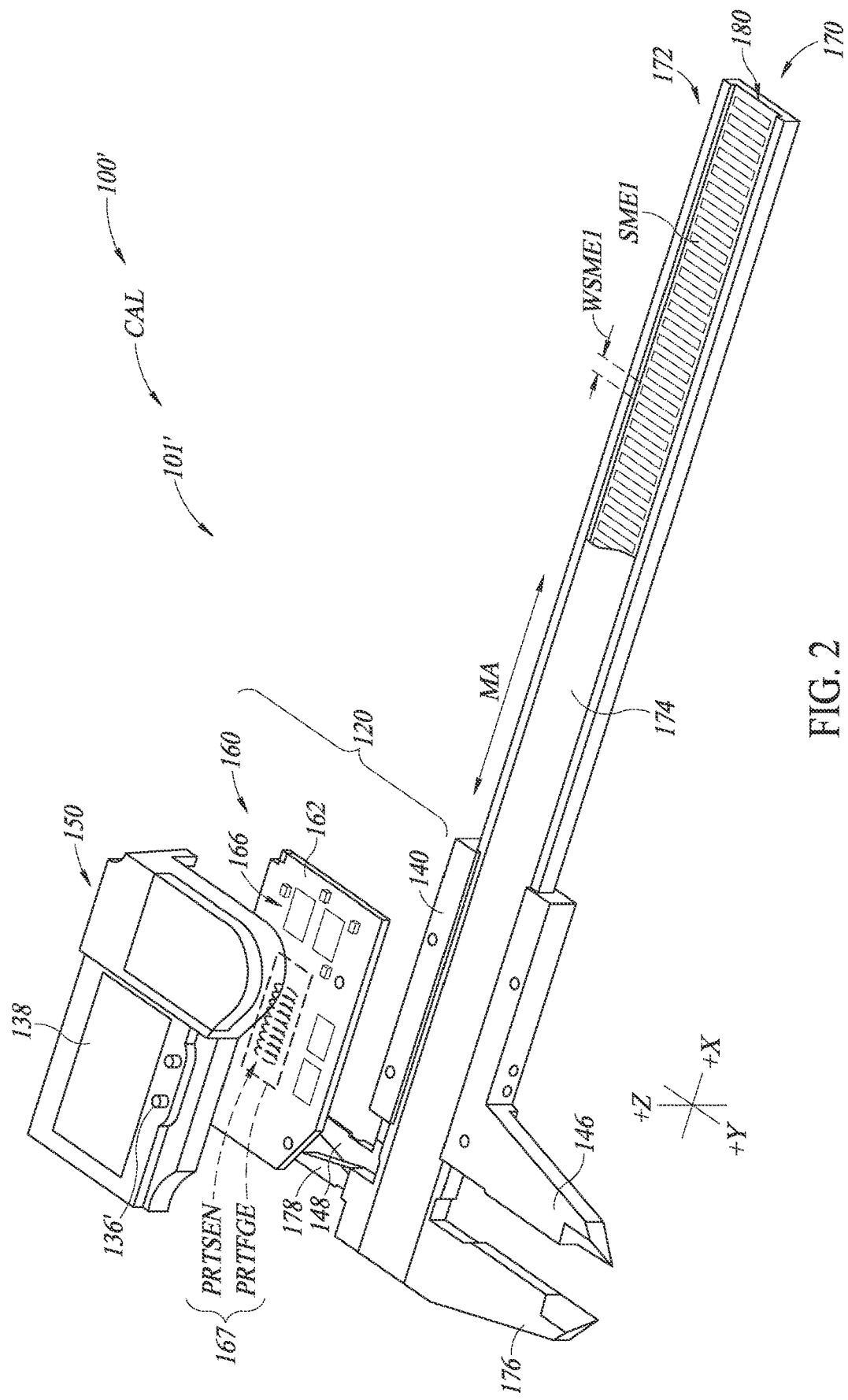
FIG. 2 is an exploded isometric view diagram of a hand tool type caliper including an inductive electronic position encoder such as that of FIG. 1.

FIG. 2 is an exploded isometric view diagram of a hand tool type caliper CAL including an electronic absolute position encoder 101' with a scale member 172 and slider assembly 120. In various implementations, the caliper CAL may be part of a metrology system 100' (e.g., such as the metrology system 100 of FIG. 1, and for which the encoder 101' may be an implementation of the encoder 101). It will be appreciated that components with certain reference numbers or symbols, including those designated with a certain number of primes (e.g. 1XX, 1XX', 1XX", etc.) or other similar or identical reference numbers or symbols of FIG. 2 and other figures herein, may correspond to and/or have similar operations as certain other components with similar or identical numbers or symbols (e.g., 1XX, etc.) of FIG. 1 and other figures herein, and may be understood by analogy thereto, except as otherwise described below. This scheme using similar numbers or symbols to indicate elements having analogous design and/or function (i.e., unless otherwise illustrated and/or described) is also applied elsewhere herein (e.g., with respect to other figures that will be described in more detail below).

As illustrated in FIG. 2, the scale member 172 may comprise a spar of roughly rectangular cross-section including a scale portion 170 positioned in a groove therein. The slider assembly 120 may include a base 140, an electronic assembly 160, and a cover 150, described in greater detail below. The electronic assembly 160 may include a detector portion 167 and a signal processing configuration 166 arranged on a substrate 162. A resilient seal (not shown) may be compressed between the cover 150 and the substrate 162 to exclude contamination from the circuitry and connections. The scale portion 170, the detector portion 167 and the signal processing configuration 166 work cooperatively to provide an inductive electronic position encoder that is usable to measure a relative position between two elements (e.g., between the scale member 172 and detector portion 167 of the slider assembly 120) along a measuring axis direction MA.

In various implementations, the scale portion 170 extends along the measuring axis direction MA (e.g., corresponding to an x-axis direction) and includes a signal modulating scale pattern portion 180, comprising signal modulating elements SME1 fabricated on a scale substrate (e.g., using known printed circuit fabrication methods). In various implementations illustrated herein, the signal modulating scale pattern portion 180 may alternatively be referred to as a periodic scale pattern portion 180. As will be described in more detail below, in various implementations the scale pattern portion 180 may include at least first and second scale element pattern portions (e.g., in a stacked configuration, in a single track configuration (STC)). For simplicity of the illustration of FIG. 2, only a first scale element pattern portion (e.g., an upper scale element pattern portion) is illustrated, which is shown to have a spatial wavelength WSME1. It will be appreciated that in various implementations the illustrated configuration may also include a second (e.g., lower) scale element pattern portion beneath the first scale element pattern portion, as will be described in more detail below. In regard to the signal modulating elements SME, in various implementations, a first scale element pattern portion may include first signal modulating elements SME1, and a second scale element pattern portion may include second signal modulating elements SME2 (e.g., as described in more detail below). In the illustrated implementation of FIG. 2, a known type of cover layer 174 (e.g., 100 μm thick) covers the scale portion 170 (as shown by a cut away portion.)

In various implementations, certain aspects of the mechanical structure and operation of the caliper CAL may be similar to that of certain prior electronic calipers, such as that of commonly assigned U.S. Pat. Nos. 5,901,458; and/or 6,400,138; and/or RE37490, each of which is hereby incorporated herein by reference in its entirety. Jaws 176 and 178 near a first end of the scale member 172 and movable jaws 146 and 148 on the slider assembly 120 are used to measure dimensions of objects in a known manner. The measured dimension may be displayed on a digital display 138, which is mounted within the cover 150 of the electronic assembly 160. The cover 150 may also include an on/off switch 136' and other optional control elements (e.g., control buttons) if desired, which actuate circuits or elements included in the electronic assembly 160. The base 140 of the slider assembly 120 may include various known elements that are configured to guide it along a mating edge of the scale member 172 to ensure proper alignment for measuring, while moving the slider assembly 120 relative to the scale portion 170.

As shown in FIG. 2, the detector portion 167 may include a field generating portion PRTFGE and a sensing portion PRTSEN arranged along the measuring axis direction MA. In one specific illustrative example, the detector portion 167 may be arranged parallel with and facing the scale portion 170, and a front face of the detector portion 167 that faces the scale portion 170 may be separated from the scale portion 170 (and/or the scale pattern portion 180) by a gap (e.g., on the order of 0.5 mm) along the z-axis direction. The front face of the detector portion 167 (e.g., including its constituent conductors) may be covered by an insulative coating. For simplicity of the illustration of FIG. 2, the field generating portion PRTFGE and sensing portion PRTSEN are shown according to simplified representations, for which a more detailed structure and operation of the field generating portion PRTFGE and the sensing portion PRTSEN will be described in greater detail below (e.g., with respect to FIG. 3, etc.).

It will be appreciated that the caliper CAL shown in FIG. 2 is one of various applications that typically implement an electronic position encoder that has evolved over a number of years to provide a relatively optimized combination of compact size, low power operation (e.g., for long battery life), high resolution and high accuracy measurement, low cost, robustness to contamination, etc. For example, other applications that are perhaps even more challenging in terms of improving evolved accuracy, cost effective design and fabrication include medium and high accuracy digital "dial" indicators (e.g., providing accuracy on the order of 10 micrometers and 1 micrometer, respectively.) Even small improvements in any of these factors in any of these applications are highly desirable, but difficult to achieve, especially in light of the design constraints imposed in order to achieve commercial success in the various applications. The principles disclosed and claimed herein provide improvements in a number of these factors for various applications.

Figure 16:
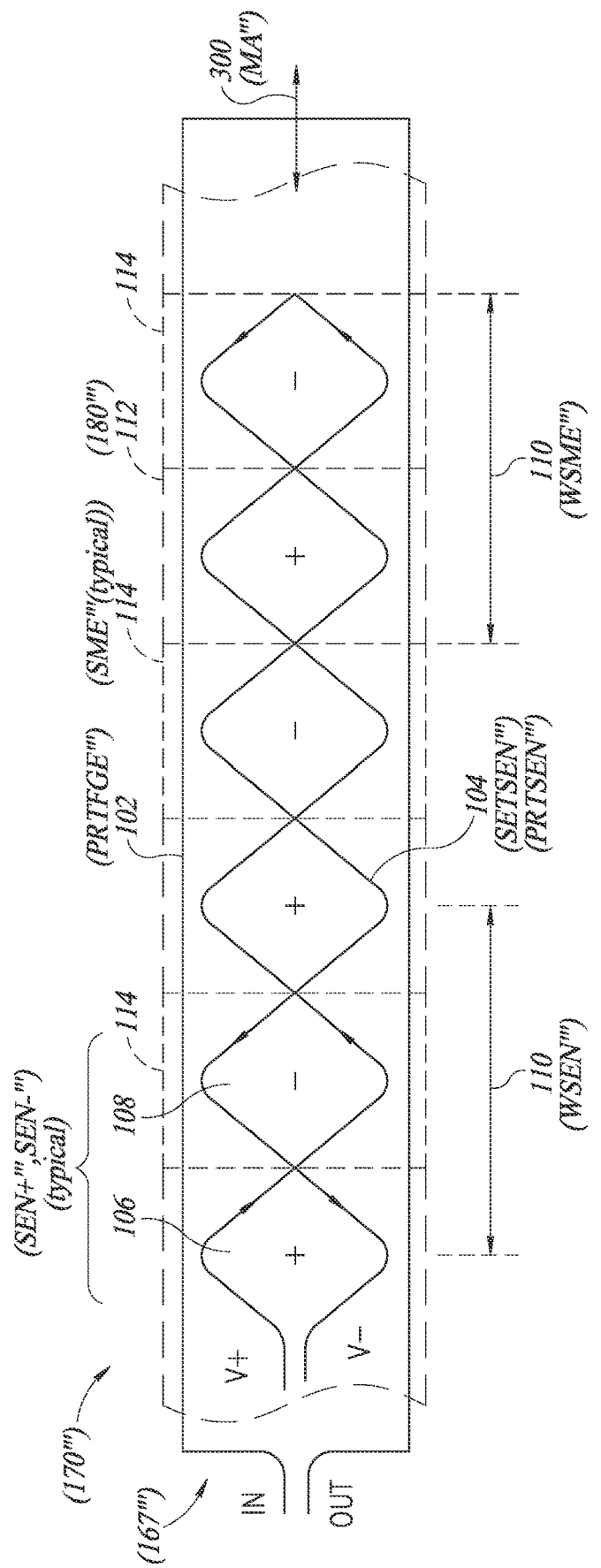
FIG. 16 is a plan view diagram schematically illustrating certain features of a representative prior art inductive electronic position encoder, presented as background information that is relevant to various principles disclosed herein.

FIG. 16 is a plan view diagram schematically illustrating certain features of a representative prior art inductive electronic position encoder shown in the previously incorporated '389 patent, presented as background information that is relevant to various principles disclosed elsewhere herein.

FIG. 16 furthermore includes reference numeral annotations to show the comparable reference numerals or symbols used to designate comparable elements in other figures included herein. In the following abbreviated description, which is based on the disclosure of the '389 patent, some of the comparable reference numbers in other figures of the present disclosure are shown in parentheses adjacent to the original reference numerals from the '389 patent. A full description related to the prior art FIG. 16 may be found in the '389 patent. Therefore, only an abbreviated description (e.g., including certain teachings from the '389 patent that are relevant to the present disclosure) is included here.

As disclosed in the '389 patent, a transducer such as that shown in FIG. 16 includes at least two substantially coplanar paths of wire or windings. A transmitter winding 102 (PRTFGE''') forms a large planar loop. In this example, the transmitter winding 102 forms an entire field generating portion PRTFGE'''. A receiver winding 104 (PRTSEN''', SETSEN'''), in substantially the same plane as the transmitter winding 102, is laid out in one direction as indicated by the arrows in a zig-zag or sinusoidal pattern and then in a reverse direction as indicated by the arrows so that the winding crosses over itself to form alternating loops 106 (SEN+''') and 108 (SEN−''') interposed between each other, as shown. As a result, each of the alternating loops 106 (SEN+''') and 108 (SEN−''') of the receiver winding 104 (PRTSEN''', SETSEN''') have a different winding direction as compared to adjacent loops. By applying an alternating (changing) current to the transmitter winding 102 (PRTFGE'''), the transmitter winding produces a time-varying magnetic field (a changing magnetic flux), extending through the loops 106 (SEN+''') and 108 (SEN−''') of the receiver winding 104 (PRTSEN''', SETSEN'''). In various implementations, the loops 106 (SEN+''') and 108 (SEN−''') may be designated as a set of sensing elements (SETSEN''') of a sensing portion (PRTSEN''').

If a scale portion (170''') or scale pattern 112 (180''') (a segment of which is outlined by edges indicating alternating long-dash lines and short-dash lines in FIG. 16), including a conductive object (e.g., a conductive plate 114 (SME'''), several of which are outlined using short-dash lines on the scale pattern 112 in FIG. 16), is moved close (proximate) to the detector portion (167'''), the varying magnetic field generated by the transmitter winding 102 (PRTFGE''') will induce eddy currents in the conductive object, which in turn sets up a magnetic field from the object that counteracts the varying transmitter magnetic field (the changing magnetic flux). As a result, the magnetic flux that the receiver winding 104 (PRTSEN''') receives is altered or disrupted, thereby causing the receiver winding to output a non-zero EMF signal (a voltage) at the output terminals V+ and V− of the receiver winding 104, which will change polarity as the conductive object moves between the "+" and "−" loops 106 (SEN+''') and 108 (SEN−''').

The distance between the location of two loops of the same polarity, (e.g., between the location of a loop 106 (SEN+''') to the location of the next loop 106 (SEN+''')) is defined as a pitch or wavelength 110 (WSEN''') of the set of sensing elements (SETSEN'''), and in certain implementations may be equal to a pitch or wavelength 110 (WSME''') of the scale pattern (180''') of the scale portion (170'''). It may be seen that each loop 106 (SEN+''') and/or 108 (SEN−''') therefore has a length or maximum dimension 0.5*(WSEN''') along the measuring axis direction (MA'''). If the conductive object described above (e.g., a conductive plate 114 (SME''')) is proximate to the receiver winding 104 (PRTSEN''') and is continuously varied in position along a measuring axis 300 (MA'''), the AC amplitude of the signal output from the receiver winding (PRTSEN''') will vary continuously and periodically with the wavelength 110 (WSME''') due to the periodic alteration of the loops 106 (SEN+''') and 108 (SEN−''') and local disruption of the transmitted magnetic field caused by the conductive object (e.g., a conductive plate 114 (SME''')). The signal output from the receiver winding (PRTSEN''') may thus be utilized (e.g., processed) to indicate a relative position between the detector portion (167''') and the scale portion (170'''). It will be appreciated that the transmitter winding 102 (PRTFGE''') and the receiver winding 104 (PRTSEN''') shown in FIG. 16 and described above are one example of a prior art implementation of elements that are designated as a detector portion (167''').

Figure 3:
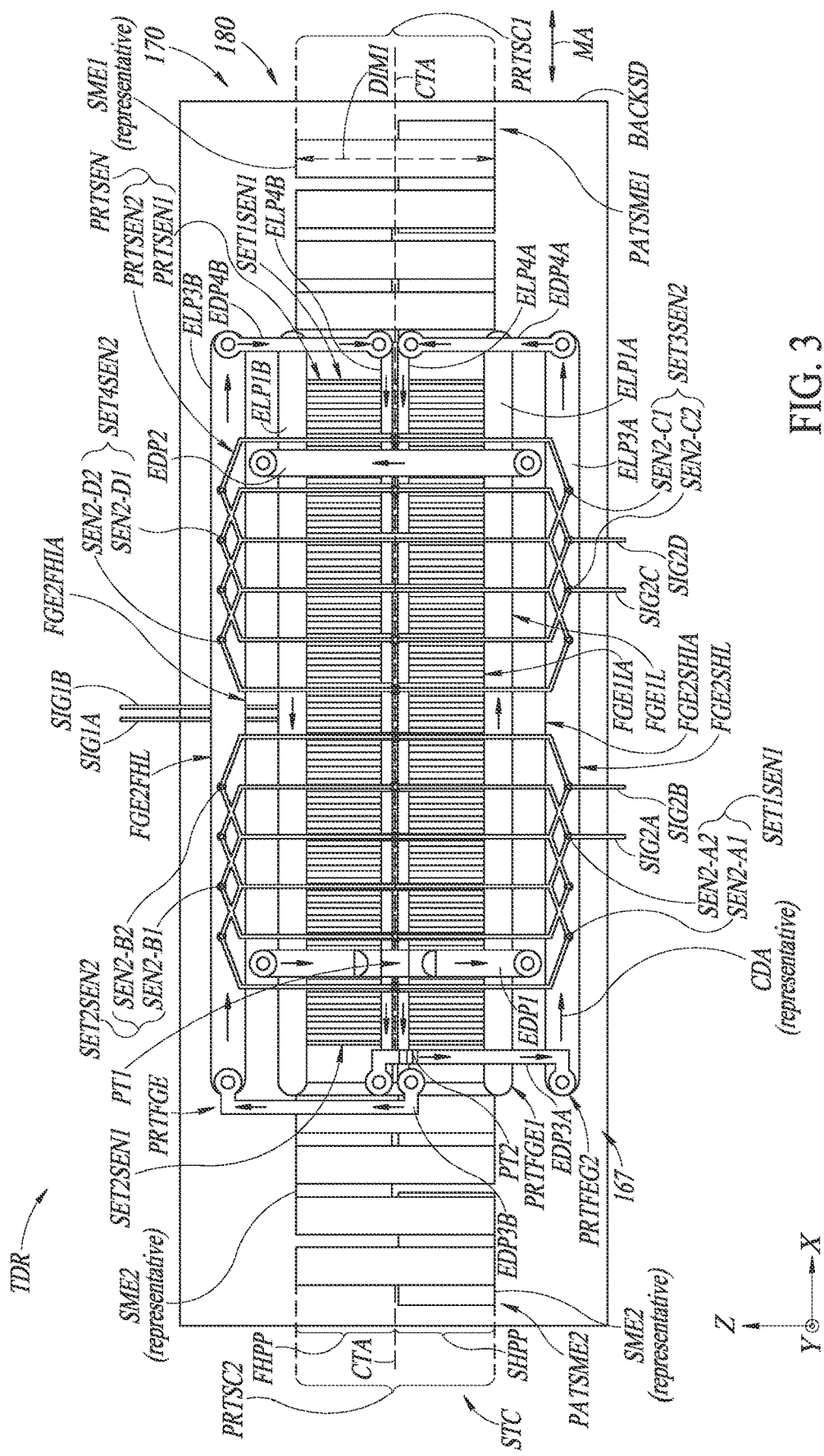
FIG. 3 is a diagram of a first implementation of a transducer including a scale portion and a detector portion such as may be utilized in the position encoder of FIG. 1.
Figure 4:
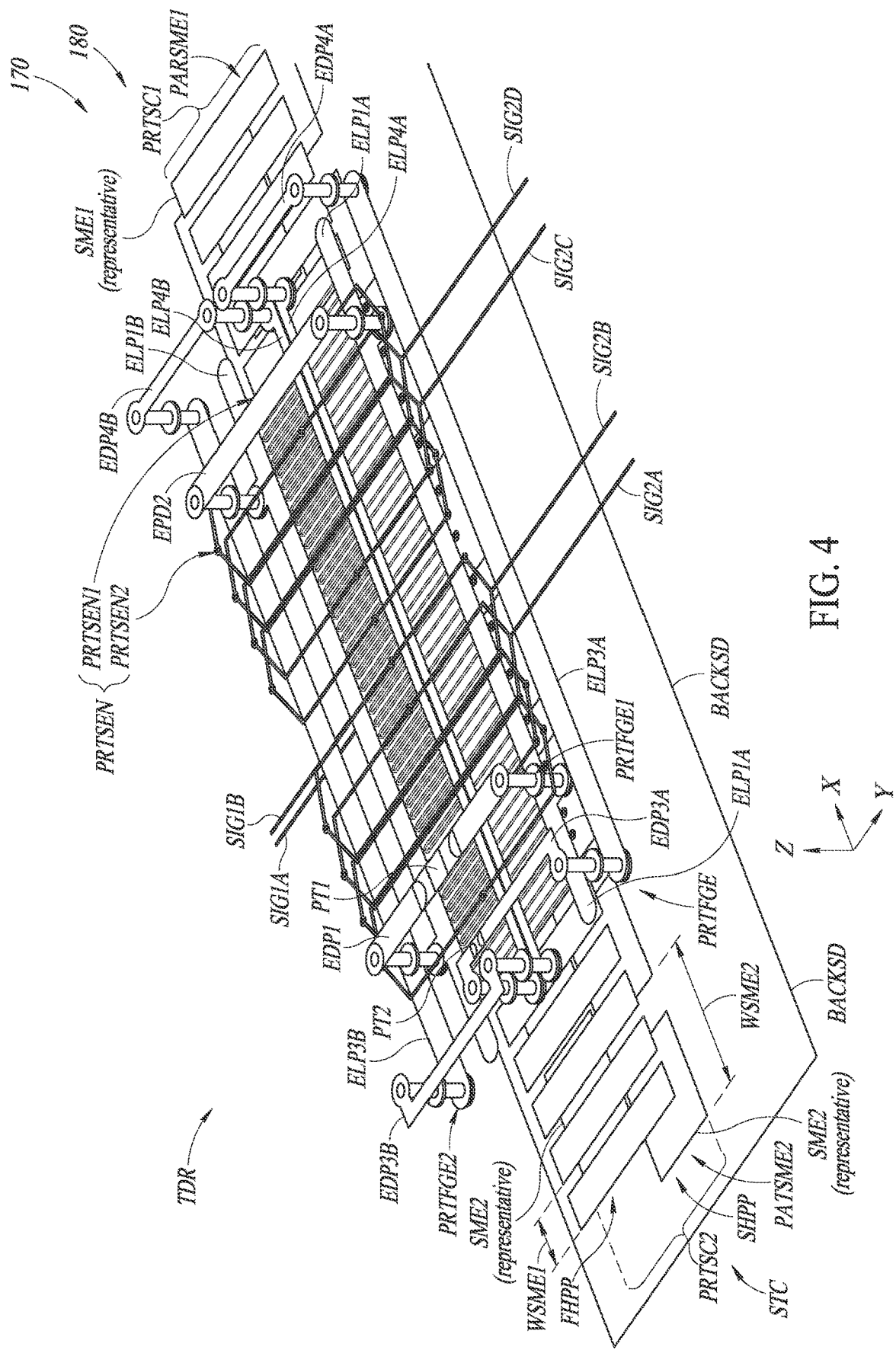
FIG. 4 is a diagram of a perspective view of the transducer of FIG. 3.

FIGS. 3 and 4 are diagrams of a transducer TDR formed in accordance with principles as disclosed herein (i.e., with FIG. 3 illustrating a top view and FIG. 4 illustrating a perspective view). The transducer TDR includes a scale portion 170 and a detector portion 167, such as may be utilized in the position encoder 101 and/or 101' of FIGS. 1 and 2. It will be appreciated that certain aspects of the field generating elements and sensing elements of a detector portion (e.g., detector portion 167, etc.) as described herein may operate and be understood based at least in part on principles as described above with respect to FIG. 16. In the implementation of FIGS. 3 and 4, the scale portion 170, the detector portion 167 and a signal processing configuration 166 (e.g., of FIGS. 1 and 2) work cooperatively to provide the inductive electronic position encoder 101 that is usable to measure a relative position between two elements (e.g., between the detector portion 167 and the scale 170 and/or elements attached thereto), along a measuring axis direction MA.

In various implementations, the scale portion 170 extends along the measuring axis direction MA (e.g., corresponding to an x-axis direction) and includes a first scale element portion PRTSC1 including first signal modulating elements SME1 and a second scale element portion PRTSC2 including second signal modulating element SME2 (e.g., for which certain similar elements will be described in more detail below with respect to FIGS. 10-12). The first signal modulating elements SME1 are disposed along the measuring axis direction MA according to, and thus form, a first signal modulating element pattern PATSME1. The second signal modulating elements SME2 are disposed along the measuring axis direction MA according to, and thus form, a second signal modulating element pattern PATSME2. The first signal modulating element pattern PATSME1 and the second signal modulating element pattern PATSME2 are respective parts of a periodic scale pattern 180 of the scale portion 170. In various implementations illustrated herein, the periodic scale pattern 180 may alternatively be referred to as a signal modulating pattern 180. In various implementations, the first and/or second signal modulating elements SME1 and SME2 (i.e., as included in the first and second scale element portions PRTSC1 and PRTSC2) may be fabricated (e.g., in different respective layers) on a scale substrate (e.g., using known printed circuit fabrication methods, such as on a scale substrate SUBSC as illustrated in FIG. 6B). Other possible fabrications methods (e.g., utilizing a glass substrate, etc.) for one or both scale element portions PRTSC1 and PRTSC2 are described in more detail below.

The relative movement between the detector portion 167 and the scale portion 170 may indicate relative positions and/or measurements (e.g., in relation to physical elements that may be coupled to the detector portion 167 or the scale portion 170, such as first and second objects for determining a relative position between the first and second objects, or first and second jaws (e.g., 146 and 176 of FIG. 2) or other measurement elements that an object may be placed between for measuring a dimension of the object, etc.). A measured relative position or dimension may be displayed on a display 138 (e.g., a digital display). In various implementations, control elements 136 such as an on/off switch and other optional control buttons may be included. The position encoder 101 may also include various known elements (e.g., physical mounting and/or motion elements, etc.) that are configured to guide the movement of the detector portion 167 (e.g., for sliding, etc.) relative to the scale portion 170.

As shown in FIGS. 3 and 4, the detector portion 167 may include a field generating portion PRTFGE and a sensing portion PRTSEN arranged along the measuring axis direction MA. The field generating portion PRTFGE includes a first field generating element portion PRTFGE1 and a second field generating element portion PRTFGE2. The sensing portion PRTSEN includes a first sensing element portion PRTSEN1 and a second sensing element portion PRTSEN2. As will be described in more detail below, the first sensing element portion PRTSEN1 is configured to operate in conjunction with the first field generating element portion PRTFGE1 and the first scale element portion PRTSC1, and the second sensing element portion PRTSEN2 is configured to operate in conjunction with the second field generating element portion PRTFGE2 and the second scale element portion PRTSC2.

In various implementations, the field generating portion PRTFGE may include a number of elongated portions and end portions. The elongated portions may generally extend along, and thus be parallel to, the measuring axis direction MA (e.g., and correspondingly the x-axis direction), while the end portions may generally be transverse (e.g., perpendicular) to the measuring axis direction MA (e.g., and correspondingly the x-axis direction, for which the end portions may extend along the y-axis direction). The elongated portions and end portions in combination may form areas (e.g., in which changing magnetic flux may be generated by current flow through the elongated portions and end portions that results from drive signals) and for which the areas may include certain of the sensing elements.

For example, in various implementations, at least part of the field generating portion PRTFGE may include a first field generating element portion PRTFGE1, which includes elongated portions ELP1A, ELP1B, and end portions EDP1, EDP2, which in some implementations may be regarded as forming a first field generating element loop FGE1L with an interior area FGE1IA. The first field generating element interior area FGE1IA is configured to be aligned with the first sensing element portion PRTSEN1 and the first scale element portion PRTSC1. The first field generating element portion PRTFGE1 is configured to operate in conjunction with the first sensing element portion PRTSEN1 and with first signal modulating elements SME1 of the first scale element portion PRTSC1.

The end portion EDP1 may include a port PT1 (e.g., for which the end portion EDP1 may be divided into two parts with contact points provided in the port PT1 for the first field generating element portion PRTFGE1, such as two contact points through which drive signals may be provided, such as representative of locations where signal lines/circuit traces from the signal processing configuration 166 may connect, etc.). In various implementations, the first field generating element portion PRTFGE1 may generate changing magnetic flux in response to drive signals (e.g., for utilization in combination with the first scale element portion PRTSC1 and first sensing element portion PRTSEN1, such as for generating signals in the first sensing elements SEN1 of the first sensing element portion PRTSEN1). In various implementations, any signals resulting from the effects of the second scale element portion PRTSC2 may effectively cancel, for which the signals from the first sensing element portion PRTSEN1 will primarily be due to the effect of the first scale element portion PRTSC1, as will be described in more detail below.

During operations, alternating current may be provided, although in order to simplify the following description only one direction of current is described (e.g., for purposes of example of one direction of current and/or as may occur in configurations where diodes or other components/configurations are provided to limit the current flow to one direction). As one example, current (e.g., as provided by drive signals) may flow through the following sequence of portions (e.g., in the following order for current in one direction), including: part of end portion EDP1; elongated portion ELP1A; end portion EDP2; elongated portion ELP1B; and part of end portion EDP1. More specifically, this indicates a current flow in a counter-clockwise direction through the first field generating element loop FGE1L that is formed by the components, which generates a corresponding magnetic flux, including in the interior area FGE1IA. As noted above, such current flow (e.g., with the resulting magnetic flux as affected by the first signal modulating elements SME1) results in generated signals in first sensing elements SEN1 in the first sensing element portion PRTSEN1.

As another example, in various implementations, at least part of the field generating portion PRTFGE may include a second field generating element portion PRTFGE2, which is configured to operate in conjunction with the second sensing element portion PRTSEN2 and with second signal modulating elements SME2 of the second scale element portion PRTSC2. The second field generating element portion PRTFGE2 includes elongated portions ELP3A, ELP3B, ELP4A, ELP4B and end portions EDP3A, EDP3B, EDP4A, EDP4B (e.g., which in some implementations may be regarded as forming two field generating element loops, such as in a figure-8 configuration, and/or otherwise as a single field generating element loop that forms two loops in such a configuration as to form two interior areas). More specifically, the elongated portions ELP3B and ELP4B and end portions EDP3B and EDP4B may be regarded as forming a second field generating element first half loop FGE2FHL with an interior area FGE2FHIA. The second field generating element first half interior area FGE2FHIA is configured to be aligned with the first half pattern portion FHPP of the second scale element portion PRTSC2. The elongated portions ELP3A and ELP4A and end portions EDP3A and EDP4A may be regarded as forming a second field generating element second half loop FGE2SHL with an interior area FGE2SHIA. The second field generating element second half interior area FGE2SHIA is configured to be aligned with the second half pattern portion SHPP of the second scale element portion PRTSC2. In various implementations, the second field generating element second half loop FGE2SHL with the interior area FGE2SHIA is on an opposite side of a central axis CTA of the transducer TDR as the second field generating element first half loop FGE2FHL with the interior area FGE2FHIA.

The end portion EDP3A may include a port PT2 (e.g., for which the end portion EDP3A may be divided into two parts with contact points provided in the port PT2 for the second field generating element portion PRTFGE2, such as two contact points through which drive signals may be provided, such as representative of locations where signal lines/circuit traces from the signal processing configuration 166 may connect, etc.). In various implementations, the second field generating element portion PRTFGE2 may generate changing magnetic flux in response to drive signals (e.g., for utilization in combination with the second scale element portion PRTSC2 and second sensing element portion PRTSEN2, such as for generating signals in the second sensing elements SEN2 of the second sensing element portion PRTSEN2). In various implementations, any signals resulting from the effects of the first scale element portion PRTSC1 may effectively cancel, for which the signals from the second sensing element portion PRTSEN2 will primarily be due to the effect of the second scale element portion PRTSC2, as will be described in more detail below.

During operations, alternating current may be provided, although in order to simplify the following description only one direction of current is described (e.g., for purposes of example of one direction and/or as may occur in configurations where diodes or other components/configurations are provided to limit the current flow to one direction). As one example, current (e.g., as provided by drive signals), may flow through the following sequence of portions (e.g., in the following order for current in one direction), including: end portion EDP3A; elongated portion ELP3A; end portion EDP4A; elongated portion ELP4A; and end portion EDP3B; elongated portion ELP3B; end portion EDP4B; and elongated portion ELP4B (e.g., as indicated by current direction arrows CDA in FIG. 3). In accordance with this example of current flow, it will be appreciated that the current flow is in the same direction (e.g., left to right in the illustration of FIG. 3) through the elongated portions (i.e., elongated portions ELP3A and ELP3B) at the outer boundaries of the configuration, and is in the same direction (i.e., right to left in the illustration of FIG. 3) through the elongated portions (i.e., elongated portions ELP4A and ELP4B) in the middle of the configuration. This also corresponds to current flow around the second field generating element first half loop FGE2FHL in the clockwise direction, and current flow around the second field generating element second half loop FGE2SHL in a counter-clockwise direction (i.e., for which the directions of current flow through the respective loops are noted to be opposite, with corresponding opposite polarities of the resulting magnetic flux from each respective loop).

Such directions/orientations/polarities of current flow and corresponding magnetic flux may be advantageous for certain configurations, such as resulting in generated signals in second sensing elements SEN2 (e.g., such as at least partially aligned with the interior areas FGE2FHIA and FGE2SHIA of the second field generating element portion PRTFGE2). As one aspect in particular, it is noted that in relation to the opposite directions of current flow and corresponding opposite polarities of the magnetic flux generated by the respective loops FGE2FHL and FGE2SHL, the spatially offset first and second half pattern portions FHPP and SHPP will result in detector signals (i.e., from the second sensing element portion PRTSEN2) that indicate the position of the second sensing element portion PRTSEN2 relative to the second scale element portion PRTSC2. In contrast, it is noted that in relation to the opposite directions of current flow and corresponding opposite polarities of the magnetic flux generated by the respective loops FGE2FHL and FGE2SHL, the first scale element portion PRTSC1 may generally not result in such detector signals from the second sensing element portion PRTSEN2. More specifically, in accordance with the illustrated configuration, each of the first signal modulating elements SME1 of the first scale element portion PRTSC1 is noted to have a same amount of area that is aligned with each of the respective interior areas FGE2FHIA and FGE2SHIA of the respective loops FGE2FHL and FGE2SHL (e.g., each first signal modulating element SME1 may be regarded as having at least a first portion that is aligned with the first half interior area FGE2FHIA and a second portion that is aligned with the second half interior area FGE2FHIA, for which the first and second portions are of equal size). Due to the opposite polarities of the magnetic flux in the interior areas FGE2FHIA and FGE2SHIA, the effects of the first portion and second portion of each first signal modulating element SME1 effectively cancel each other with regard to the overall effect on the detector signals from the second sensing element portion PRTSEN2.

In various implementations, such characteristics are utilized to at least partially enable the second transducer portion PRTTDR2 (FIG. 5) to operate without being significantly affected by the presence of the first signal modulating elements SME1 of the first scale element portion PRTSC1 (e.g., which may be located in between or otherwise closer to the second sensing element portion PRTSEN2 than the second scale element portion PRTSC2). As further described elsewhere herein, the first transducer portion PRTTDR1 (FIG. 5) is also at least partially enabled to operate without being significantly affected by the presence of the second signal modulating elements SME2 of the second scale element portion PRTSC1 (e.g., due at least in part to the distance of the second scale element portion PRTSC2 being sufficiently far away, with a large enough gap, from the first sensing element portion PRTSEN1). In some instances, the second scale element portion PRTSC2 may be characterized as being out of the "sensing range" of the first sensing element portion PRTSEN1, which is in contrast to the first scale element portion PRTSC1 which is configured to be close enough, with a small enough gap, to be within the "sensing range" of the first sensing element portion PRTSEN1.

Figure 5:
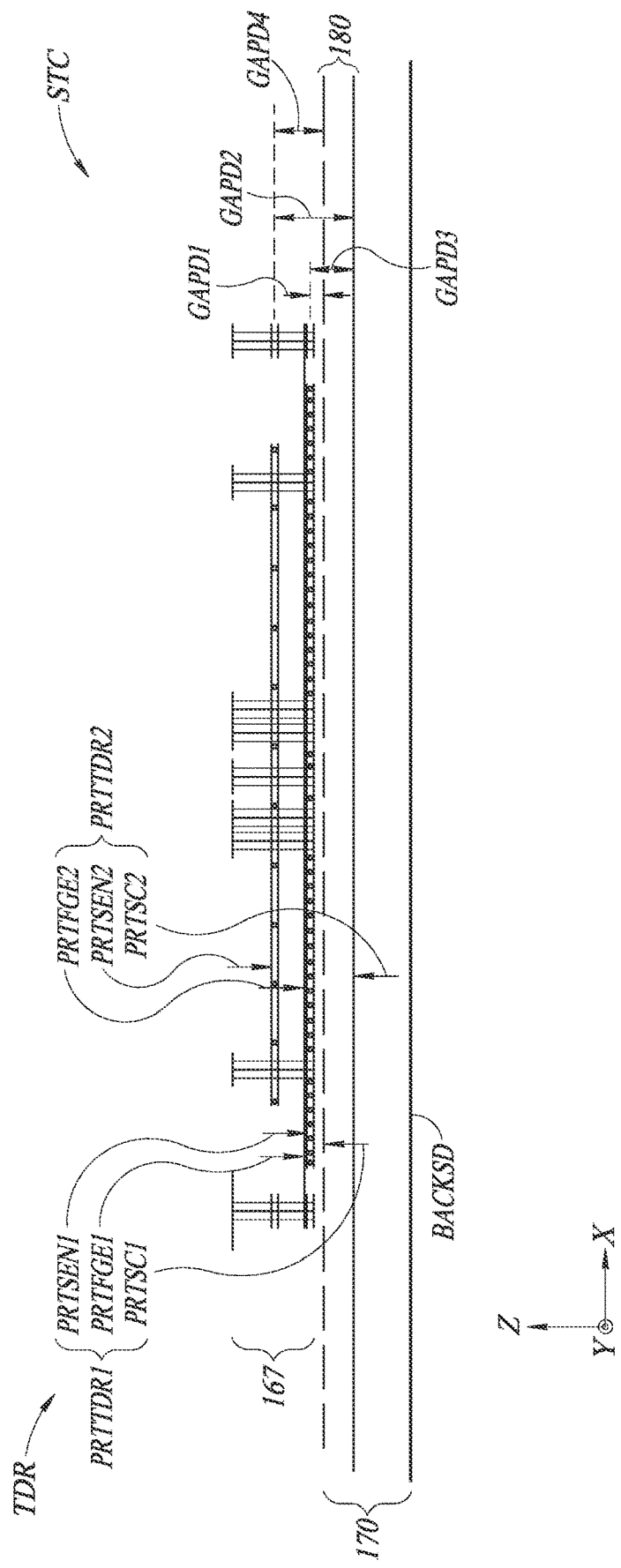
FIG. 5 is a diagram of a side view of the transducer of FIG. 3.

In various implementations, certain additional techniques may also or alternatively be utilized for the operations of the field generating element portions PRTFGE1 and PRTFGE2 of the first and second transducer portions PRTTDR1 and PRTTDR2 (FIG. 5). For example, in some implementations the second field generating element portion PRTFGE2 of the second transducer portion PRTTDR2 may be operated at a relatively lower frequency, relative to the operation of the first field generating element portion PRTFGE1 of the first transducer portion PRTTDR1. Such operations of the second field generating element portion PRTFGE2 may effectively increase the relative signal strength of the signals from the second sensing element portion PRTSEN2 (e.g., due to the relatively lower frequency enabling more magnetic field to pass through the first scale element portion PRTSC1, such as passing through the skin depth, etc., thus enabling higher signal strength in relation to the effects on the magnetic field of the second scale element portion PRTSC2).

As will be described in more detail below (e.g., with respect to certain examples of FIGS. 8 and 9), in various implementations a first signal modulating element spatial wavelength WSME1 (FIG. 4) of the first scale element portion PRTSC1 may be equal to a first sensing element spatial wavelength of the first sensing element portion PRTSEN1, and a second signal modulating element spatial wavelength WSME2 (FIG. 4) of the second scale element portion PRTSC2 may be equal to a second sensing element spatial wavelength of the second sensing element portion PRTSEN2. In the illustrated implementation, the sensing elements SEN1 and SEN2 comprise sensing loop elements (alternatively referred to as sensing coil elements or sensing winding elements) which are connected in series and are nominally perpendicular relative to the measuring axis direction MA. As used herein, the term "nominally" encompasses variations of one or more parameters that fall within acceptable tolerances. As an example, in one implementation a term such as "nominally" may correspond to a minimal variance from a specified value (e.g., such as a variance of less than 5%, or less than 2%, or less than 1%, such as in accordance with acceptable tolerances, etc.). In various exemplary implementations, the first sensing elements SEN1 each have a first maximum width dimension along the measuring axis direction MA, and the second sensing elements SEN2 each have a second maximum width dimension along the measuring axis direction MA that is different than the first maximum width dimension (e.g., FIGS. 8 and 9).

In the illustrated implementation, adjacent loop elements (e.g., conductive loops) in each respective set of sensing elements are connected by a configuration of conductors on various layers of PCB (e.g., connected by feedthroughs which in some implementations may include conductors passing through micro-vias, which may also be referenced as blind vias or buried vias) according to known methods. For example, the adjacent sensing elements SEN1 in each set of the first sensing element portion PRTSEN1 may have opposite winding polarities (e.g., with the sensing elements in each respective set alternating between SEN+ and SEN−, such as described above with respect to FIG. 16). That is, if a first loop corresponding to a sensing element responds to a changing magnetic field with a positive polarity detector signal contribution, then the adjacent loops corresponding to adjacent sensing elements respond with a negative polarity detector signal contribution. Loops having a positive polarity detector signal contribution may be designated SEN+ sensing elements herein, and loops having a negative polarity detector signal contribution may be designated SEN− sensing elements in various contexts herein. In various implementations, the sensing elements in each respective set are connected in series such that their detector signals or signal contributions are summed per set, and a "summed" detector signal is output at detector signal output connections (e.g., at the connections for each of the signals SIG1A and SIG1B) to a signal processing configuration 166 (e.g., of FIG. 1).

It will be appreciated that in various implementations it is advantageous to configure the detector to provide two or more sets of sensing elements at different spatial phase positions (e.g., to provide or otherwise correspond to quadrature signals, etc.), as will be understood by one of ordinary skill in the art. Thus, for example, the first set of first sensing elements SET1SEN1 and the second set of first sensing elements SET2SEN1 are at different spatial phase positions (e.g., as will be described in more detail below with respect to the example of FIG. 8). However, it should be appreciated that the configurations of sensing elements as described herein are intended to be exemplary only, and not limiting. As one example, individual sensing element loops may output individual signals to a corresponding signal processing configuration in some implementations, for example as disclosed in U.S. Pat. No. 9,958,294, which is hereby incorporated by reference in its entirety. More generally, various known sensing element configurations may be used in combination with the principles disclosed and claimed herein, for use in combination with various scale pattern and signal processing schemes, etc.

In the illustrated implementation, the second signal modulating element pattern PATSME2 includes a first half pattern portion FHPP and a second half pattern portion SHPP (e.g., on opposite sides of a central axis CTA of the transducer TDR), with each half pattern portion including a row of second signal modulating elements SME2 (e.g., as will be described in more detail below with respect to the example of FIG. 11). In each scale row the second signal modulating elements SME2 are spaced according to a second signal modulating element spatial wavelength WSME2. For the two adjacent scale rows in the half pattern portions, the spatial phase of the scale row in the second half pattern portion is offset from the spatial phase of the adjacent scale row in the first half pattern portion by ½ of the second signal modulating element spatial wavelength WSME2 (e.g., as will be described in more detail below with respect to the example of FIG. 11). In this example, the signal modulating element spatial phase offset OFFSETSME2=½ of the second signal modulating element spatial wavelength WSME2 (e.g., which may correspond to a 180 degree spatial phase shift/difference between the adjacent scale rows).

In various exemplary implementations, the first set of first sensing elements SET1SEN1 are disposed along the measuring axis direction MA according to the first sensing element spatial wavelength WSME1; and the first set of second sensing elements SET1SEN2 are disposed along the measuring axis direction MA according to a second sensing element spatial wavelength WSME2 that is different than the first sensing element spatial wavelength WSME1.

In the illustrated implementation, the signal modulating elements SME1 and/or SME2 may comprise conductive plates (e.g., as formed by regions fabricated on a printed circuit board, or as formed by raised regions extending from a conductive substrate, or as fabricated on a glass substrate, or according to other fabrication methods, etc.). The scale pattern 180 is generally implemented on the scale portion 170. It will be appreciated that the scale pattern 180 moves relative to the detector portion 167 during operation. The scale pattern 180 has spatial characteristics which change as a function of position, so as to provide position dependent detector signals arising in the sensing elements SEN1 and SEN2 of the sensing portion PRTSEN in the detector portion 167.

In various implementations, the detector portion 167 is configured to be mounted proximate to the scale pattern 180, and to move along the measuring axis direction MA relative to the scale pattern 180. In various implementations, the field generating portion PRTFGE and the sensing portion PRTSEN of the detector portion 167 may be formed according to a variety of alternative configurations to be used in combination with a variety of corresponding signal processing schemes, as will be understood by one skilled in the art.

In one specific illustrative example, the detector portion 167 may be arranged parallel with and facing the scale 170, and a front face of the detector portion 167 that faces the scale 170 may be separated from the scale 170 (and/or the scale pattern 180) by a gap distance (e.g., on the order of 0.5 mm) along the z-axis direction. The front face of the detector portion 167 (e.g., including its constituent conductors) may be covered by an insulative coating.

It will be appreciated that various elements may reside on different fabrication layers located at different planes along the z-axis direction, as needed to provide various operating gaps and/or insulating layers, as will be apparent to one of ordinary skill in the art based on the following description and the incorporated references. Throughout the figures of this disclosure, it will be appreciated that the illustrated x-axis, y-axis and/or z-axis dimensions of one or more elements may be exaggerated for clarity, but it will be understood that they are not intended to contradict the various design principles and relationships disclosed and claimed herein.

FIG. 5 is a diagram showing a side view of the transducer TDR of FIGS. 3 and 4. The transducer TDR includes a first transducer portion PRTTDR1 and a second transducer portion PRTTDR2. The first transducer portion PRTTDR1 includes the first sensing element portion PRTSEN1, the first field generating element portion PRTFGE1, and the first scale element portion PRTSC1. The second transducer portion PRTTDR2 includes the second sensing element portion PRTSEN2, the second field generating element portion PRTFGE2, and the second scale element portion PRTSC2. As described herein, operations of the first transducer portion PRTTDR1 produce detector signals SIG1A and SIG1B and operations of the second transducer portion PRTTDR2 produce detector signals SIG2A, SIG2B, SIG2C, and SIG2D. Processing of the signals (e.g., by the signal processing configuration 166) enables an absolute relative position to be determined between the detector portion 167 and the scale portion 170.

In the example configuration of FIG. 5, gap distances GAPD1-GAPD4 illustrate the gaps between the respective sensing element portions (i.e., sensing element portions PRTSEN1 and PRTSEN2) and the respective scale element portions (i.e., scale element portions PRTSC1 and PRTSC2). Additional illustrations (e.g., of layer locations) are shown in more detail in FIGS. 6A and 6B, as will be described in more detail below. The first transducer portion PRTTDR1 and the second transducer portion PRTTDR2 are arranged according to the single track configuration STC (e.g., with the first scale element portion PRTSC1 stacked relative to the second scale element portion PRTSC2, and with the second sensing element portion PRTSEN2 stacked relative to the first sensing element portion PRTSEN1). The term "stacked" as utilized herein indicates that the corresponding elements or portions, etc. are stacked relative to one another along a depth direction that is approximately normal to the scale layers and/or detector layers (e.g., along a z-axis direction, such as located in different layers).

In various implementations, the first transducer portion PRTTDR1 is configured and operates in accordance with a shorter spatial wavelength (e.g., WSME1), corresponding to a relatively shorter sensing distance. It has been determined through experiment and simulation that in various implementations inductive encoder detector signals may decrease approximately exponentially with the sensor-to-scale gap according the wavelength of the encoder scale (e.g., WSME1), such as indicated by the following equation:

$$V = V_0 e^{-\frac{gap}{kWSME}} \qquad \text{(Eq. 1)}$$

where V is the signal amplitude, $V_0$ is the amplitude at gap=0, and k is a constant related to the sensor architecture. In accordance with this equation, a transducer portion (e.g., PRTTDR1) with a relatively small wavelength (e.g., WSME1) will have usable signal only at a relatively small gap (e.g., GAPD1), while a transducer portion (e.g., PRTTDR2) with a relatively large wavelength (e.g., WSME2) will still have usable signal at a relatively large gap (e.g., GAPD2). In various implementations, the wavelength WSME2 may be at least 2 times (e.g., or in some instances at least 3 or 4 times) as long as the wavelength WSME1. Such characteristics may be in accordance with a relationship where m is an integer that is at least 2 (e.g., as described herein in relation to EQUATION 2 below, etc.), which indicates a relationship for two wavelengths (e.g., WSME1 and WSME2) that may be utilized in combination for achieving an absolute range R of a position encoder.

Due at least in part to such relationships (e.g., including the relatively shorter spatial wavelength WSME1), the detector signals SIG1A and SIG1B of the first transducer portion PRTTDR1 primarily result from interactions with the first scale element portion PRTSC1 at the gap distance GAPD1, as opposed to the second scale element portion PRTSC2 at the gap distance GAPD3 (e.g., which in some instances may be characterized as generally being out of the primary sensing range of the relatively shorter sensing distance of the operations of the first transducer portion PRTTDR1 as utilizing the first sensing element portion PRTSEN1). The second transducer portion PRTTDR2 is configured and operates in accordance with the relatively longer spatial wavelength (e.g., WSME2), corresponding to a relatively longer sensing distance, with the detector signals SIG2A, SIG2B, SIG2C, and SIG2D primarily resulting from interactions with the second scale element portion PRTSC2 at the gap distance GAPD2.

In various implementations, the second transducer portion PRTTDR2 may be configured and operated (e.g., utilizing certain configurations, spatial relationships, sensing principles) such that the detector signals SIG2A, SIG2B, SIG2C, and SIG2D are relatively less effected by the first scale element portion PRTSC1 at the gap distance GAPD4. As one example, as described above with respect to FIGS. 3 and 4, the second field generating element portion PRTFGE2 may be configured and operated with two opposite polarity loops (e.g., loops FGE2FHL and FGE2SHL) for which each first signal modulating element SME1 may have two equal portions aligned with the two loops (i.e., one equal portion aligned with each loop), for which the effects of each first signal modulating element SME1 effectively cancel with regard to the overall effect on the detector signals SIG2A, SIG2B, SIG2C, and SIG2D from the second sensing element portion PRTSEN2.

Figure 6A:
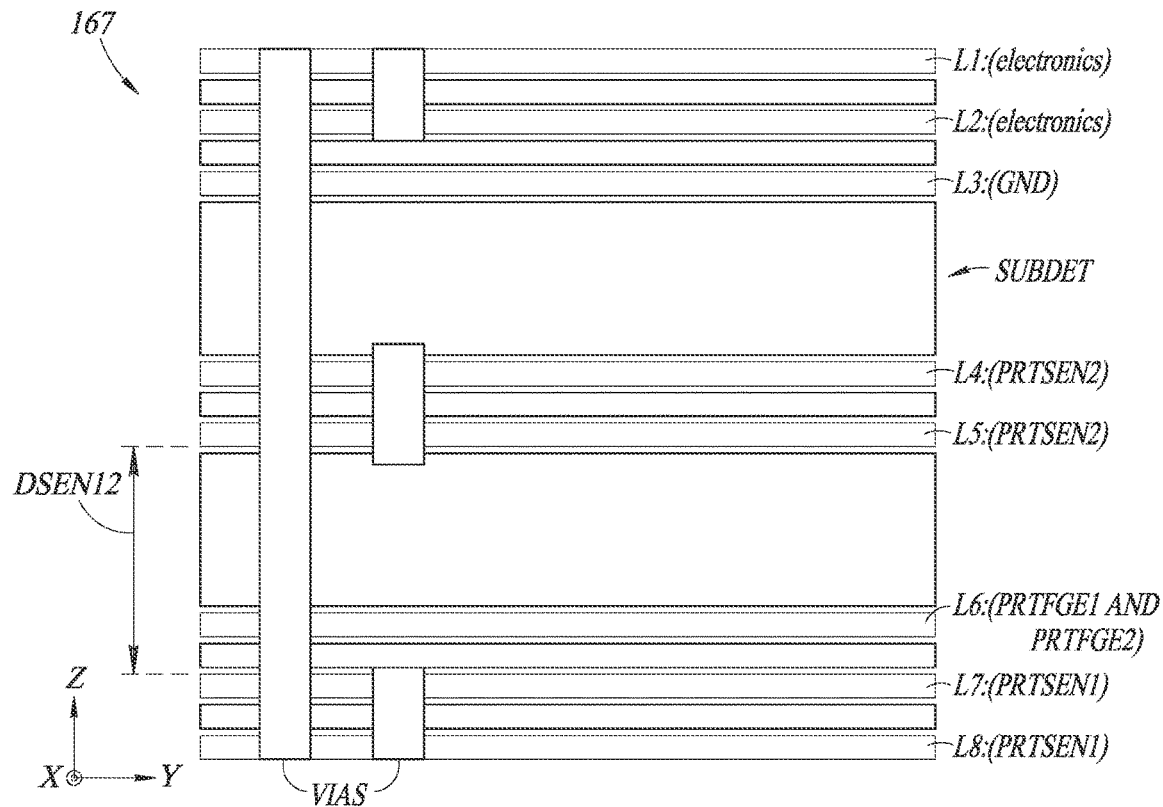
FIGS. 6A and 6B are diagrams of end views illustrating components of the transducer of FIG. 3 as located on substrates.
Figure 6B:
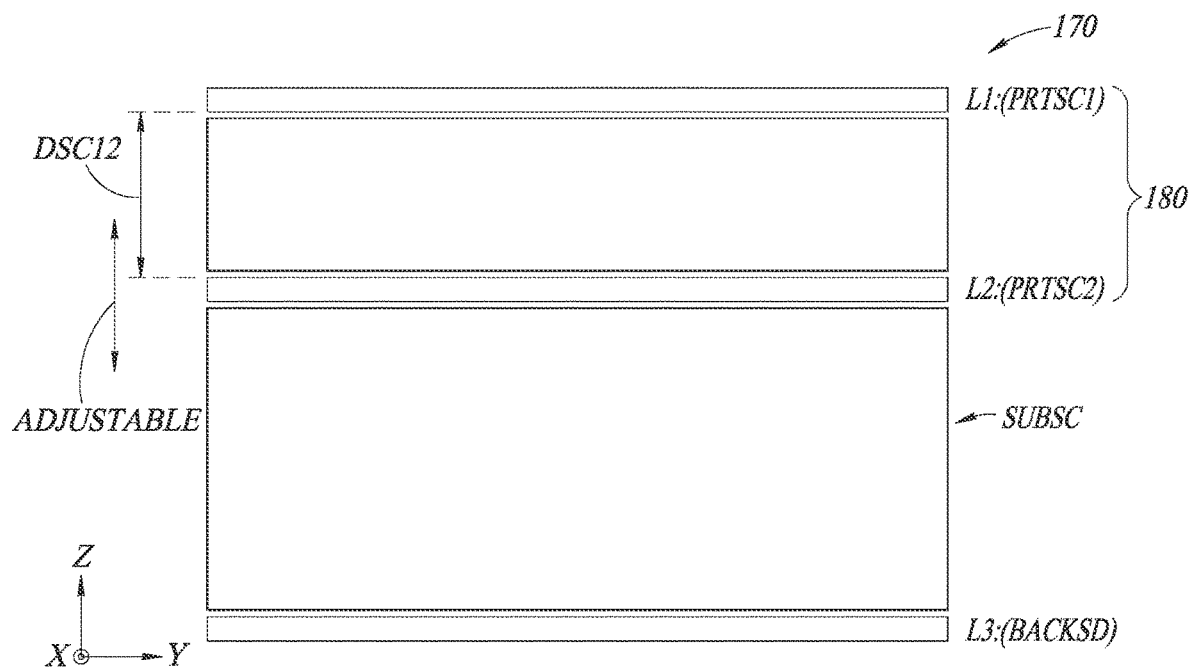

FIGS. 6A and 6B are diagrams showing a cross-sectional end view of components of the transducer TDR of FIGS. 3 and 4 (e.g., as located on substrates). As illustrated in FIG. 6A, in a specific illustrative example, the detector portion 167 is formed on a detector substrate SUBDET. As illustrated in FIG. 6B, in a specific illustrative example, the scale portion 170 including the periodic scale pattern 180 is formed on a scale substrate SUBSC. In various alternative implementations, the scale portion 170 may be formed utilizing different techniques (e.g., for which the scale element portions PRTSC1 and PRTSC2 may be formed on different types of substrates, such as both on a PCB substrate, or both on a glass substrate, or one on a PCB substrate and the other on a glass substrate, etc.)

As illustrated in FIG. 6A, the detector substrate SUBDET includes eight layers L1-L8 (i.e., for which each of the labeled layers L1-L8 is an electrical layer, and the layers between the labeled electrical layers are insulation layers). It will be appreciated that this configuration is intended to be illustrative only, and that the principles as disclosed herein may be implemented in configurations with different numbers of layers (e.g., certain alternative configurations may utilize ten layers, etc.). In the example of FIG. 6A, layers L1 and L2 comprise electronics (e.g., which may include at least part of a signal processing portion which may be part of the signal processing configuration 166 (FIG. 1), and/or which may otherwise assist with the provision and/or processing of the drive signals and/or detector signals, etc.) Layer L3 comprises a ground connection (GND). Layers L4 and L5 comprise the second sensing element portion PRTSEN2, including all of the sets of second sensing elements SEN2, with different traces on the different layers L4 and L5 (e.g., to electronically isolate at crossover portions, etc.). Layer L6 includes the first field generating element portion PRTFGE1 and the second field generating element portion PRTFGE2 of the field generating portion PRTFGE. Layers L7 and L8 comprise the first sensing element portion PRTSEN1, including both of the sets of first sensing elements SEN1, with different traces on different layers L7 and L8 (e.g., to electronically isolate at crossover portions, etc.). In this particular example, the second sensing element portion PRTSEN2 is thus stacked relative to the first sensing element portion PRTSEN1 (e.g., as located on the different respective sets of layers L4-L5 and L7-L8, respectively, of the configuration and as correspondingly separated, such as by the distance DSEN12 between layers L5 and L7, along the direction of the z-axis).

As illustrated in FIG. 6B, the scale substrate SUBSC includes three layers L1-L3 (i.e., for which the layers between the labeled layers L1-L3 are insulation layers). FIG. 6B may also be representative of implementations in which the one or both of the scale element portions are not formed on a PCB substrate (e.g., as formed on a glass substrate, etc.), as will be described in more detail below. As illustrated in FIG. 6B, layer L1 includes the first scale element portion PRTSC1 and layer L2 includes the second scale element portion PRTSC2. Layer 3 includes a backside portion BACKSD (e.g., which in various implementations may be a copper layer, etc.; see also FIGS. 3 and 4).

In various implementations, the stacked configuration of the first and second scale element portions PRTSC1 and PRTSC2 may be formed utilizing various techniques. For example, in certain implementations the first and second scale element portions PRTSC1 and PRTSC2 may be formed in different layers of a multi-layer printed circuit board (PCB). As another example, in certain implementations the first scale element portion PRTSC1 may be formed on one side of a glass substrate, which may be attached (e.g., glued) to a PCB on which the second scale element portion PRTSC2 is formed (e.g., with a copper substrate on the other side of the PCB). As another example, in certain implementations the first and second scale element portions PRTSC1 and PRTSC2 may be formed on opposite sides of a glass substrate (e.g., which may be glued to an insulator spacer with a backside copper substrate or as mounted/attached to another metal substrate).

In regard to the stacked configuration of the first and second scale element portions PRTSC1 and PRTSC2, in various implementations a distance DSC12 between the two (e.g., how far the second scale element portion PRTSC2 is below/separated from the first scale element portion PRTSC1) may be according to certain considerations. As some general principles, in certain implementations if the distance DSC12 is too great (e.g., if the second scale element portion PRTSC2 is too low), then the second detector signals (e.g., signals SIG2A, SIG2B, SIG2C and SIG2D) may be relatively weak (e.g., due to too large a gap distance GAPD2 (FIG. 5) between the second sensing element portion PRTSEN2 and the second scale element portion PRTSC2). In certain implementations if the distance DSC12 is too small (e.g., if the second scale element portion PRTSC2 is too high), then the first detector signals (e.g., signals SIG1A and SIG1B) may be undesirably affected (e.g., due to too small a gap distance GAPD3 (FIG. 5) between the first sensing element portion PRTSEN1 and the second scale element portion PRTSC2). Thus, in various implementations it may be desirable for the second scale element portion PRTSC2 to be at a distance DSC12 below the first scale element portion PRTSC1 for which the second detector signals (e.g., signals SIG2A, SIG2B, SIG2C and SIG2D) are sufficiently strong, and for which the first detector signals (e.g., signals SIG1A and SIG1B) are not significantly affected. In certain implementations, the distance DSC12 between the first and second scale element portions may fall within a specified range (e.g., as may in some instances be expressed in terms of a fraction of the wavelength WSME1, such as within a range of (0.25)WSME1 to (1.0)WSME1). In various implementations, a distance DSC12 between the first and second scale element portions may be configured to be adjustable (e.g., for enabling a distance DSC12 to be implemented which achieves desirable characteristics/performance for a particular application, etc.)

It is noted that the examples illustrated in FIGS. 5, 6A and 6B (e.g., using substrates to form the detector portion 167 and/or the scale portion 170) may be utilized to form other configurations shown in later figures (e.g., including the example configuration of FIG. 7, etc.) In various implementations, the examples of FIGS. 5, 6A and 6B may also be regarded as illustrating a side view and/or a cross-sectional end view of a general configuration and/or distances between the corresponding components of the transducer TDR' of FIG. 7.

In relation to the configurations illustrated in FIGS. 1-6B, as part of a first drive operation, the first field generating element portion PRTFGE1 generates a changing magnetic flux in response to a coil drive signal (e.g., as provided from a signal processing configuration 166). The first sensing elements SEN1 of the first sensing element portion PRTSEN1 are configured to provide detector signals (e.g., SIG1A, SIG1B) which respond to a local effect on the changing magnetic flux provided by first signal modulating elements SME1 (e.g., including first signal modulating elements SME1 that are relatively adjacent or otherwise aligned with sensing elements SEN1 along the z-axis direction) of the first scale element portion PRTSC1. As part of a second drive operation, the second field generating element portion PRTFGE2 generates a changing magnetic flux in response to a coil drive signal (e.g., as provided from a signal processing configuration 166). The second sensing elements SEN2 of the second sensing element portion PRTSEN2 are configured to provide detector signals (e.g., SIG2A, SIG2B, SIG2C, SIG2D) which respond to a local effect on the changing magnetic flux provided by second signal modulating elements SME2 (e.g., including second signal modulating elements SME2 that are relatively adjacent or otherwise aligned with sensing elements SEN2 along the z-axis direction) of the second scale element portion PRTSC2.

A signal processing configuration (e.g., the signal processing configuration 166 of FIG. 1, etc.) may be configured to determine a position of the sensing portion PRTSEN (e.g., including the first and second sensing element portions PRTSEN1 and PRTSEN2) of the detector portion 167 relative to the scale portion 170 based on the detector signals input from the detector portion 167. For example, the first sensing element portion PRTSEN1 may provide detector signals SIG1A and SIG1B, and the second sensing element portion PRTSEN2 may provide detector signals SIG2A, SIG2B, SIG2C and SIG2D. In various implementations, the detector signals may also or alternatively be referenced as sensing signals. The signals from the detector portion 167 may be input to the signal processing configuration 166, and utilized for determining the measurement/position of the detector portion 167 relative to the scale portion 170. In general, the sensing element portions and field generating element portions may at least in part operate according to known principles (e.g., for inductive encoders), such as those described in the incorporated references and as described above in relation to FIG. 16.

In various implementations the transducer TDR may be included in various types of measurement instruments and/or position determining configurations (e.g., calipers, linear scales, etc.). For example, the detector portion 167 may be fixed to a slide member, and the scale portion 170 may be fixed to a beam or spar member having a measuring axis that coincides with an x-axis direction. In such a configuration, the detector portion 167 and the scale portion 170 may be movable relative to one another along the measuring axis direction MA in a plane that extends along the x-axis direction and a y-axis direction, with a z-axis direction being orthogonal to the plane.

Figure 7:
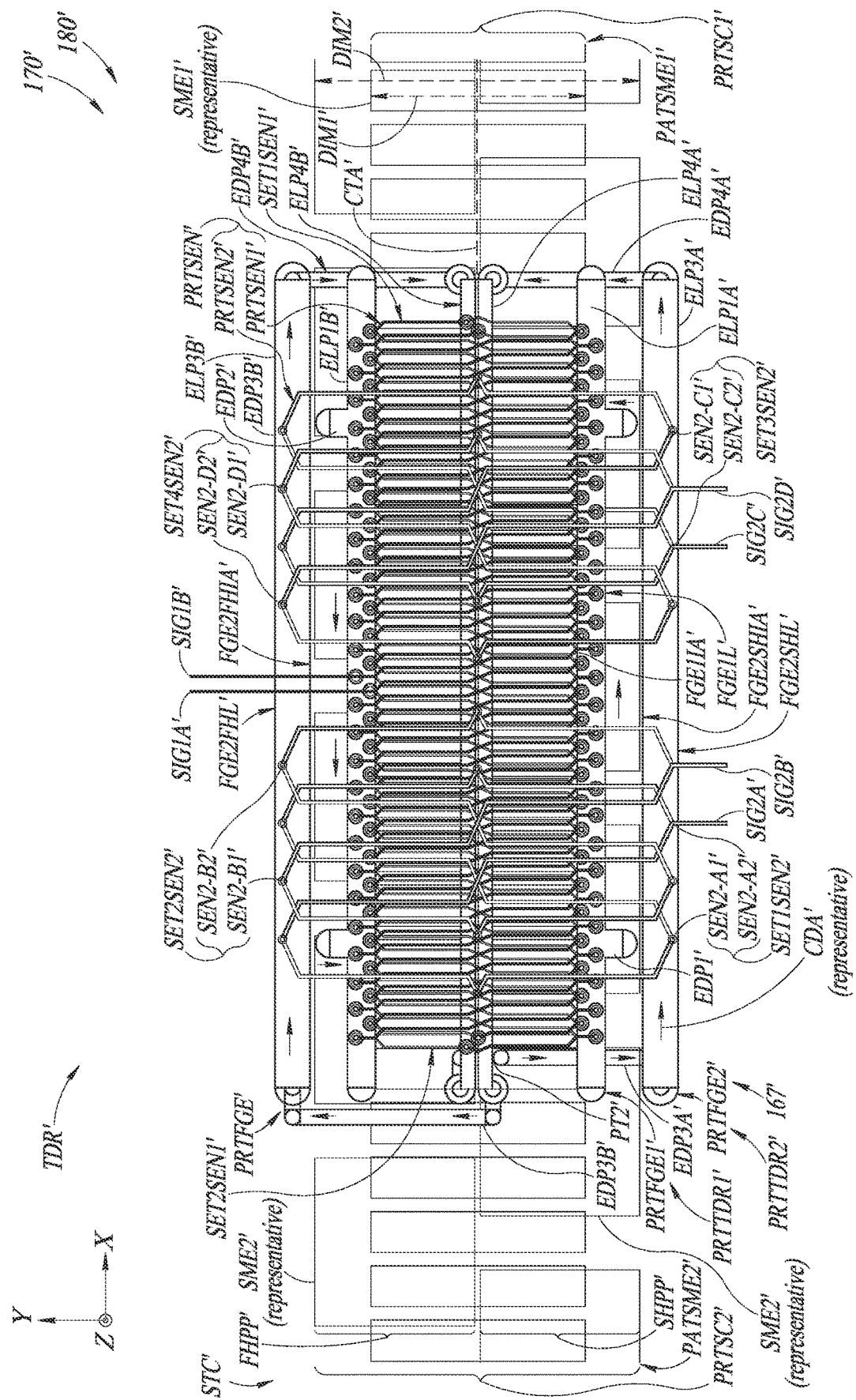
FIG. 7 is a diagram of a second implementation of a transducer including a scale portion and a detector portion such as may be utilized in the position encoder of FIG. 1.

FIG. 7 is a diagram of a second implementation of a transducer TDR' including a scale portion 170' and a detector portion 167' such as may be utilized in the position encoder 101 of FIG. 1. Similar to the configurations described above, the detector portion 167' is configured to be mounted proximate to the scale portion 170' and to move along a measuring axis direction MA' relative to the scale portion 170' over a full encoder range R'. As will be described in more detail below, FIGS. 8-11 illustrate certain more detailed aspects of the transducer TDR' (e.g., some of which also provide examples of certain more detailed aspects of the transducer TDR of FIGS. 3-4). There are also some differences of the transducer TDR' as compared to the transducer TDR, for example as described below and as can be understood by a comparison of the corresponding illustrations and descriptions.

As one difference of the transducer TDR' as compared to the transducer TDR, as illustrated in FIG. 7, the second scale element portion PRTSC2' may have a certain different dimension than the first scale element portion PRTSC1'. More specifically, along a direction perpendicular to the measuring axis direction MA' (e.g., along the y-axis direction), the first scale element portion PRTSC1' has a dimension DIM1' and the second scale element portion PRTSC2' has a dimension DIM2' that is larger than the dimension DIM1'. In contrast, in the transducer TDR as illustrated in FIG. 3, the first and second scale element portions PRTSC1 and PRTSC2 may have a same corresponding dimension DIM1. In various implementations, the larger dimension DIM2' of the transducer TDR' may result in relatively stronger signals from the second sensing element portion PRTSEN2' (e.g., stronger signals SIG2A', SIG2B', SIG2C', and SIG2D').

As a specific numerical example, for a given gap distance (e.g., a gap distance GAPD2 of FIG. 5, which may correspond to a similar gap distance between the second sensing element portion PRTSEN2' and the second scale element portion PRTSC2' in the configuration of FIG. 7), an increase in the dimension DIM2' of 50 percent (e.g., from 4 mm to 6 mm, for which the dimension DIM1 in the configuration in FIG. 3 may be 4 mm) may result in a significant increase in the strength of the signals from the second sensing element portion PRTSEN2' (e.g., an increase of approximately 2 times the signal strength). For a particular application, a tradeoff may be determined between a desired strength of the signals and the dimension DIM2' (e.g., which may affect the overall dimension of the transducer TDR' and correspondingly of the overall configuration in the direction perpendicular to the measuring axis direction MA').

In general, similar to the transducer TDR, the transducer TDR' includes a first transducer portion PRTTDR1' and a second transducer portion PRTTDR2'. The first transducer portion PRTTDR1' includes the first sensing element portion PRTSEN1', the first field generating element portion PRTFGE1', and the first scale element portion PRTSC1'. The second transducer portion PRTTDR2' includes the second sensing element portion PRTSEN2', the second field generating element portion PRTFGE2', and the second scale element portion PRTSC2'. As described herein, operations of the first transducer portion PRTTDR1' produce detector signals SIG1A' and SIG1B' and operations of the second transducer portion PRTTDR2' produce detector signals SIG2A', SIG2B', SIG2C', and SIG2D'. Processing of the signals (e.g., by the signal processing configuration 166) enables an absolute relative position to be determined between the detector portion 167' and the scale portion 170'.

In the transducer TDR' of FIG. 7, at least part of the field generating portion PRTFGE' may include the first field generating element portion PRTFGE1', which includes elongated portions ELP1A', ELP1B', and end portions EDP1', EDP2', which in some implementations may be regarded as forming a first field generating element loop FGE1L' with an interior area FGE1IA'. The first field generating element interior area FGE1IA' is configured to be aligned with the first sensing element portion PRTSEN1' and the first scale element portion PRTSC1'. The first field generating element portion PRTFGE1' is configured to operate in conjunction with the first sensing element portion PRTSEN1' and with first signal modulating elements SME1' of the first scale element portion PRTSC1'.

In various implementations, at least part of the field generating portion PRTFGE' may include the second field generating element portion PRTFGE2', which is configured to operate in conjunction with the second sensing element portion PRTSEN2' and with second signal modulating elements SME2' of the second scale element portion PRTSC2'. The second field generating element portion PRTFGE2' includes elongated portions ELP3A', ELP3B', ELP4A', ELP4B' and end portions EDP3A', EDP3B', EDP4A', EDP4B' (e.g., which in some implementations may be regarded as forming two field generating element loops, such as in a figure-8 configuration, and/or otherwise as a single field generating element loop that forms two loops in such a configuration as to form two interior areas). More specifically, the elongated portions ELP3B' and ELP4B' and end portions EDP3B' and EDP4B' may be regarded as forming a second field generating element first half loop FGE2FHL' with an interior area FGE2FHIA'. The second field generating element first half interior area FGE2FHIA' is configured to be aligned with the first half pattern portion FHPP' of the second scale element portion PRTSC2'. The elongated portions ELP3A' and ELP4A' and end portions EDP3A' and EDP4A' may be regarded as forming a second field generating element second half loop FGE2SHL' with an interior area FGE2SHIA'. The second field generating element second half interior area FGE2SHIA' is configured to be aligned with the second half pattern portion SHPP' of the second scale element portion PRTSC2'. In various implementations, the second field generating element second half loop FGE2SHL' with the interior area FGE2SHIA' is on an opposite side of a central axis CTA' of the transducer TDR' as the second field generating element first half loop FGE2FHL' with the interior area FGE2FHIA'.

In various exemplary implementations, those components of the field generating portion PRTFGE' including the first field generating element portion PRTFGE1' and the second field generating element portion PRTFGE2' function in a manner similar to how the corresponding components of the field generation portion PRTFGE as described above with respect to FIGS. 3 and 4 function. In this connection, it is noted that the elements of FIG. 7 are designated with primes (e.g., TDR', etc.), which correspond to and/or have the same operations as components with identical numbers or symbols without primes (e.g., TDR, etc.) of FIGS. 3 and 4, and may be understood as corresponding to the same description and operations, except as otherwise described below.

Figure 8:
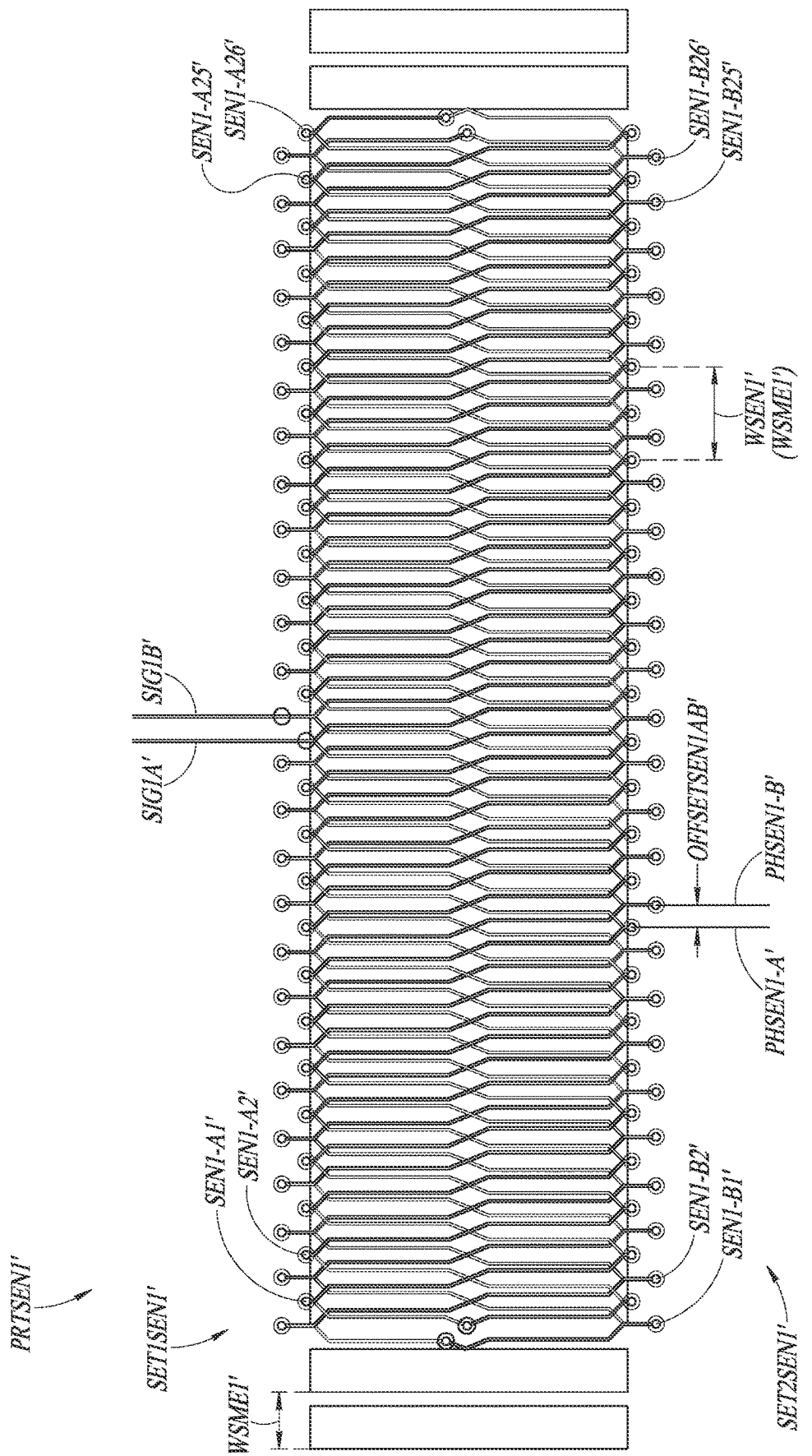
FIG. 8 is a diagram illustrating a first sensing element portion of the transducer of FIG. 7.

As illustrated in FIG. 7 in additional reference to FIG. 8, the first sensing element portion PRTSEN1' includes the first set of first sensing elements SET1SEN1' and the second set of first sensing elements SET2SEN1'. In the illustrated implementation, the first set of first sensing elements SET1SEN1' includes twenty-six first sensing elements SEN1' (i.e., including first sensing elements SEN1-A1' to SEN1-A26'), and the second set of first sensing elements SET2SEN1' includes twenty-six first sensing elements SEN1' (i.e., including first sensing elements SEN1-B1' to SEN1-B26'). For simplicity of the illustration, only the first two (i.e., A1'-A2' and B1'-B2') and last two (i.e., A25'-A26' and B25'-B26') sensing elements of each set are labeled in FIG. 8, although the sensing elements (i.e., A3'-A24' and B3'-B24') will similarly be understood to correspond to the remaining sensing elements as shown.

The first and second sets of first sensing elements SET1SEN1' and SET2SEN1' are at different spatial phase positions, as separated by a first sensing element spatial phase offset OFFSETSEN1AB' between a first set first sensing element spatial phase PHSEN1-A' and a second set first sensing element spatial phase PHSEN1-B'. A first sensing element spatial wavelength (or pitch) WSEN1' of the first sensing element portion PRTSEN1' (e.g., of each of the sets of first sensing elements SET1SEN1' and SET2SEN1') may correspond to (e.g., be equal to) the first signal modulating element spatial wavelength WSME1' of the first scale element portion PRTSC1'. In various implementations, the first sensing element spatial phase offset OFFSETSEN1AB' may be equal to approximately ¼ of the spatial wavelength WSEN1' (e.g., in accordance with a quadrature configuration, as will be understood by one skilled in the art).

In various implementations, in accordance with the principles as described above, the adjacent sensing elements SEN1' in each set of the first sensing element portion PRTSEN1' may have opposite winding polarities (e.g., with the sensing elements in each respective set alternating between SEN+ and SEN−, such as described above with respect to FIG. 16). That is, if a first loop responds to a changing magnetic field with a positive polarity detector signal contribution, then the adjacent loops respond with a negative polarity detector signal contribution. In various implementations, in relation to the operations of the first transducer portion PRTTDR1' as utilizing the first sensing element portion PRTSEN1', the effects on the magnetic field/flux as caused by the second scale element portion PRTSC2' may be substantially common-mode to the first sensing element portion PRTSEN1' (e.g., with the sensing elements in each respective set alternating between SEN+ and SEN−). As a result, the second scale element portion PRTSC2' may have little effect on the corresponding detector signals (e.g., SIG1A', SIG1B') that are produced (i.e., for which the second scale element portion PRTSC2' is relatively undetectable/nearly invisible to the first sensing element portion PRTSEN1'). This may be in addition to the fact that the second scale element portion PRTSC2' may primarily be out of the sensing range of the first sensing element portion PRTSEN1' as utilized by the first transducer portion PRTTDR1' (e.g., as described above with respect to FIG. 5).

In various implementations, the first sensing elements SEN1' in each respective set are connected in series such that their detector signals or signal contributions are summed per set, and a "summed" detector signal is output from the respective set of first sensing elements. Accordingly, the first set of first sensing elements SET1SEN1' produces/provides the detector signal SIG1A', and the second set of first sensing elements SET2SEN1' produces/provides the detector signal SIG1B'. The detector signals SIG1A' and SIG1B' are provided to and received by a signal processing configuration 166 (e.g., of FIG. 1).

In various implementations, the number of additional sets of first sensing elements (e.g., the second set of first sensing elements SET2SEN1' in addition to the first set of first sensing elements SET1SEN1') is different than the number of additional sets of second sensing elements (e.g., a second, third and fourth set of second sensing elements SET2SEN2', SET3SEN2' and SET4SEN2', in addition to the first set of second sensing elements SET1SEN2') as will be more fully described below.

Figure 9:
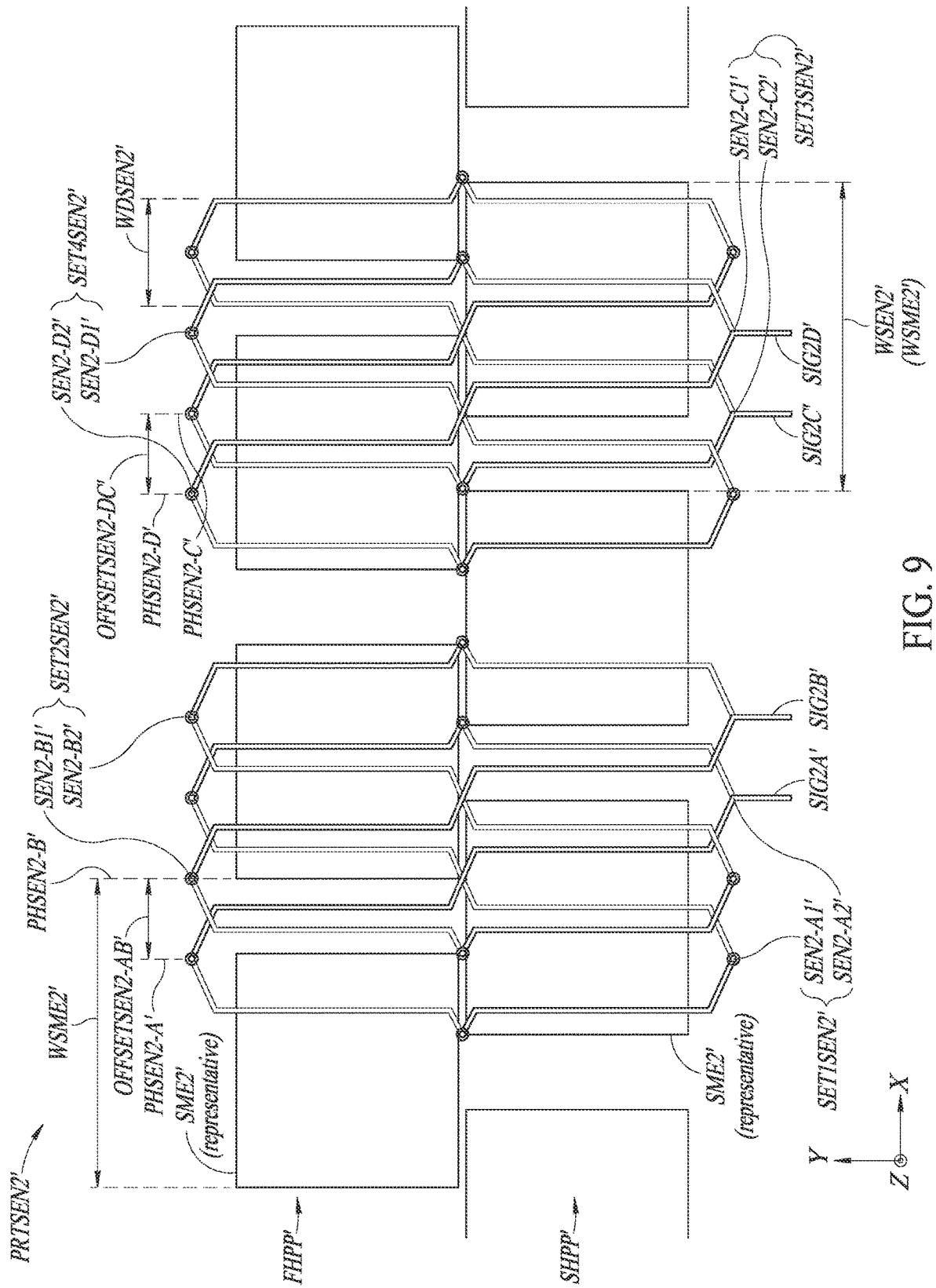
FIG. 9 is a diagram illustrating a second sensing element portion of the transducer of FIG. 7.

As illustrated in FIG. 7 in additional reference to FIG. 9, the second sensing element portion PRTSEN2' includes the first, second, third and fourth sets of second sensing elements SET1SEN2', SET2SEN2', SET3SEN2' and SET4SEN2', respectively. In the illustrated implementation, each set of second sensing elements includes two second sensing elements. More specifically the first set of second sensing elements SET1SEN2' includes second sensing elements SEN2-A1' and SEN2-A2'. The second set of second sensing elements SET2SEN2' includes second sensing elements SEN2-B1' and SEN2-B2'. The third set of second sensing elements SET3SEN2' includes second sensing elements SEN2-C1' and SEN2-C2'. The fourth set of second sensing elements SET4SEN2' includes second sensing elements SEN2-D1' and SEN2-D2'.

The first and second sets of second sensing elements SET1SEN2' and SET2SEN2' are at different spatial phase positions, as separated by a second sensing element spatial phase offset OFFSETSEN2AB' between a first set second sensing element spatial phase PHSEN2-A' and a second set second sensing element spatial phase PHSEN2-B'. Similarly, the third and fourth sets of second sensing elements SET3SEN2' and SET4SEN2' are at different spatial phase positions, as separated by a second sensing element spatial phase offset OFFSETSEN2-DC' between a fourth set second sensing element spatial phase PHSEN2-D' and a third set second sensing element spatial phase PHSEN2-C'. A second sensing element spatial wavelength (or pitch) WSEN2' of the second sensing element portion PRTSEN2' (e.g., of each of the sets of second sensing elements) may correspond to (e.g., be equal to) the second signal modulating element spatial wavelength WSME2' of the second scale element portion PRTSC2'. In various implementations, the offset OFFSETSEN2-AB' may be equal to the offset OFFSETSEN2-DC', which may be equal to approximately one-fourth of the spatial wavelength WSME2' (e.g., as part of a quadrature configuration).

As part of such a quadrature configuration or otherwise, in one specific example if the spatial phase PHSEN2-A' is designated as zero degrees, the spatial phase PHSEN2-B' may correspond to 90 degrees, the spatial phase PHSEN2-C' may correspond to 180 degrees, and the spatial phase PHSEN2-D' may correspond to 270 degrees, all as part of a four phase configuration (e.g., which in various implementations may also or alternatively be referenced as a four spatial phase configuration). In various implementations, the utilization of the four spatial phase configuration may naturally filter out fourth harmonics. In certain configurations, an implementation with m=4 (e.g., in accordance with EQUATION 2, etc. as described herein below) may cause the first scale elements SME1' of the first scale element portion PRTSC1' to be at the fourth harmonic, thus making the first scale element portion PRTSC1' relatively undetectable (e.g., nearly invisible) to the second sensing element portion PRTSEN2'.

In various implementations, a dimension WDSEN2' (i.e., as corresponding to a width of a single sensor SEN2') may be equal to approximately ⅓ of the wavelength WSME2'. In various implementations, this dimensional relationship may help reduce errors that may result from a third harmonic of the configuration. More specifically, in an implementation with m=4 (e.g., in accordance with EQUATION 2, etc.) certain third harmonic errors may arise in certain signals (e.g., in signals SIG2A', SIG2B', SIG2C' and SIG2D' of the second sensing element portion PRTSEN2'), which may be mitigated/addressed by the width WDSEN2' being approximately ⅓ of the wavelength WSME2'.

In various implementations, in accordance with the principles as described above, the adjacent sensing elements SEN2' in each set of the second sensing element portion PRTSEN2' may have opposite winding polarities (e.g., with the sensing elements in each respective set alternating between SEN+ and SEN−, such as described above with respect to FIG. 16). That is, if a first loop responds to a changing magnetic field with a positive polarity detector signal contribution, then the adjacent loop responds with a negative polarity detector signal contribution, and vice versa. In various implementations, the second sensing elements SEN2' in each respective set are connected in series such that their detector signals or signal contributions are summed per set, and a "summed" detector signal is output from the respective set of second sensing elements. Accordingly, the first, second, third and fourth sets of second sensing elements SET1SEN2', SET2SEN2', SET3SEN2' and SET4SEN2' produce/provide the detector signals SIG2A', SIG2B', SIG2C' and SIG2D', respectively, as provided to and received by a signal processing configuration 166 (e.g., of FIG. 1).

Figure 10:
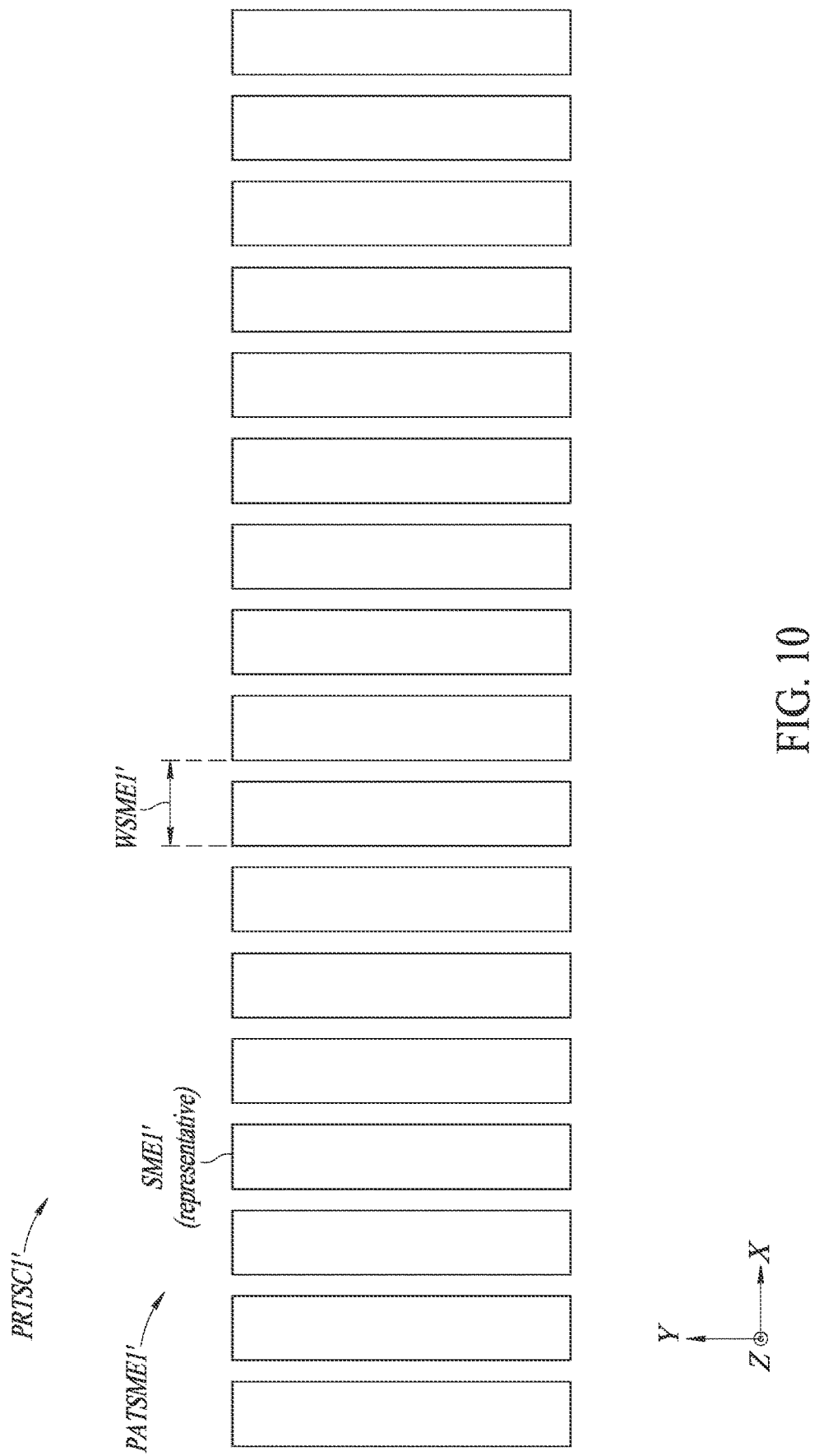
FIG. 10 is a diagram illustrating a first scale element portion of the transducer of FIG. 7.

As illustrated in FIG. 7 in additional reference to FIG. 10, the first signal modulating element pattern PATSME1' of the first scale element portion PRTSC1' includes the first signal modulating elements SME1'. The first signal modulating elements SME1' are spaced according to the first signal modulating element spatial wavelength WSME1'.

Figure 11:
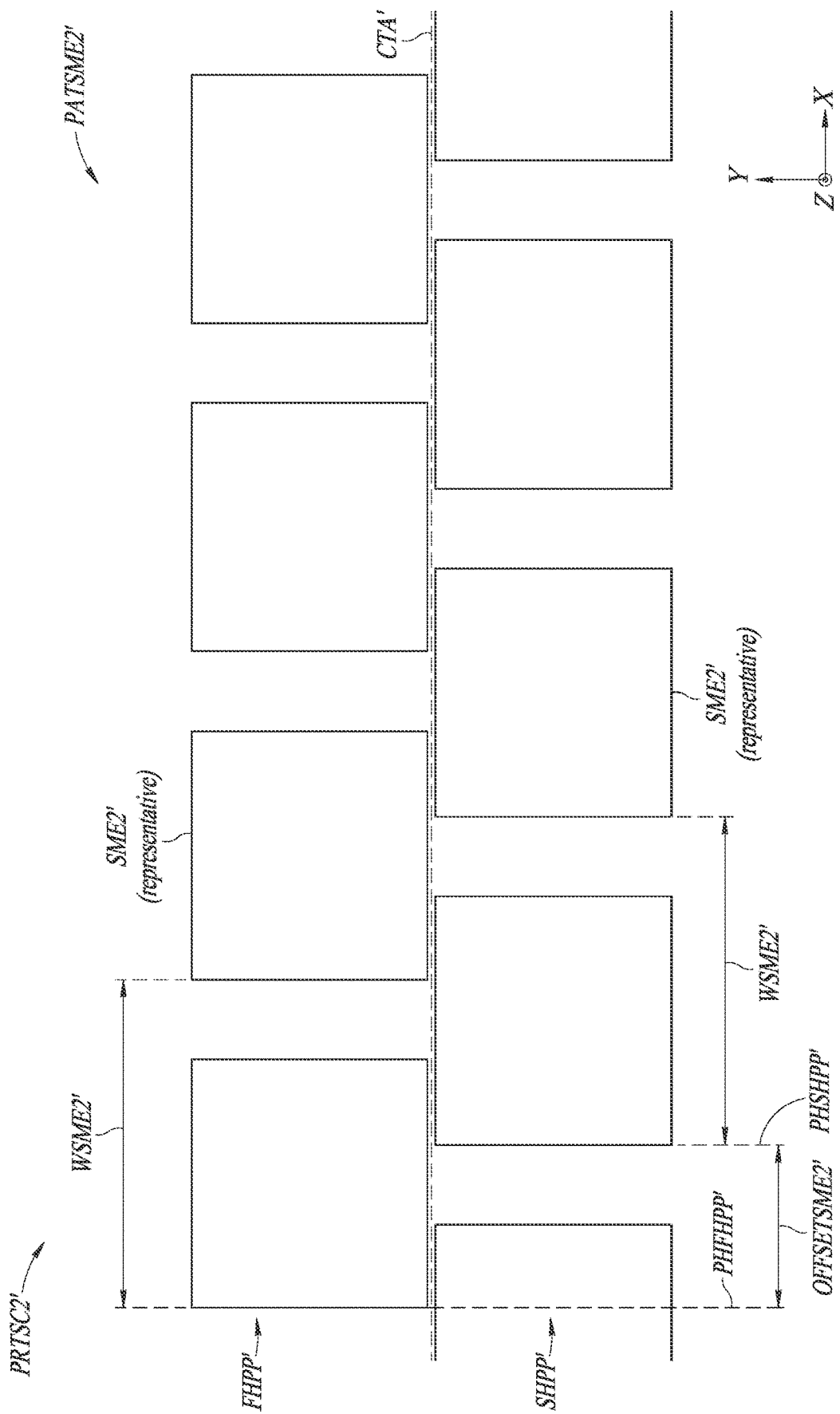
FIG. 11 is a diagram illustrating a second scale element portion of the transducer of FIG. 7.

As illustrated in FIG. 7 in additional reference to FIG. 11, the second signal modulating element pattern PATSME2' of the second scale element portion PRTSC2' includes the first half pattern portion FHPP' and the second half pattern portion SHPP' (e.g., on opposite sides of the central axis CTA' of the transducer TDR'), with each half pattern portion including a row of second signal modulating elements SME2'. In each row of each half pattern portion, the second signal modulating elements SME2' are spaced according to a second signal modulating element spatial wavelength WSME2'. The first half pattern portion FHPP' and the second half pattern portion SHPP' are at different spatial phase positions, as separated by a second signal modulating element spatial phase offset OFFSETSME2' between a first half pattern portion spatial phase PHFHPP' and a second half pattern portion spatial phase PHSHPP'. In various implementations, the second signal modulating element spatial phase offset OFFSETSME2' may be equal to ½ of the second signal modulating element spatial wavelength WSME2' (e.g., which may correspond to a 180 degree spatial phase shift/difference between the adjacent scale rows).

Figure 12:
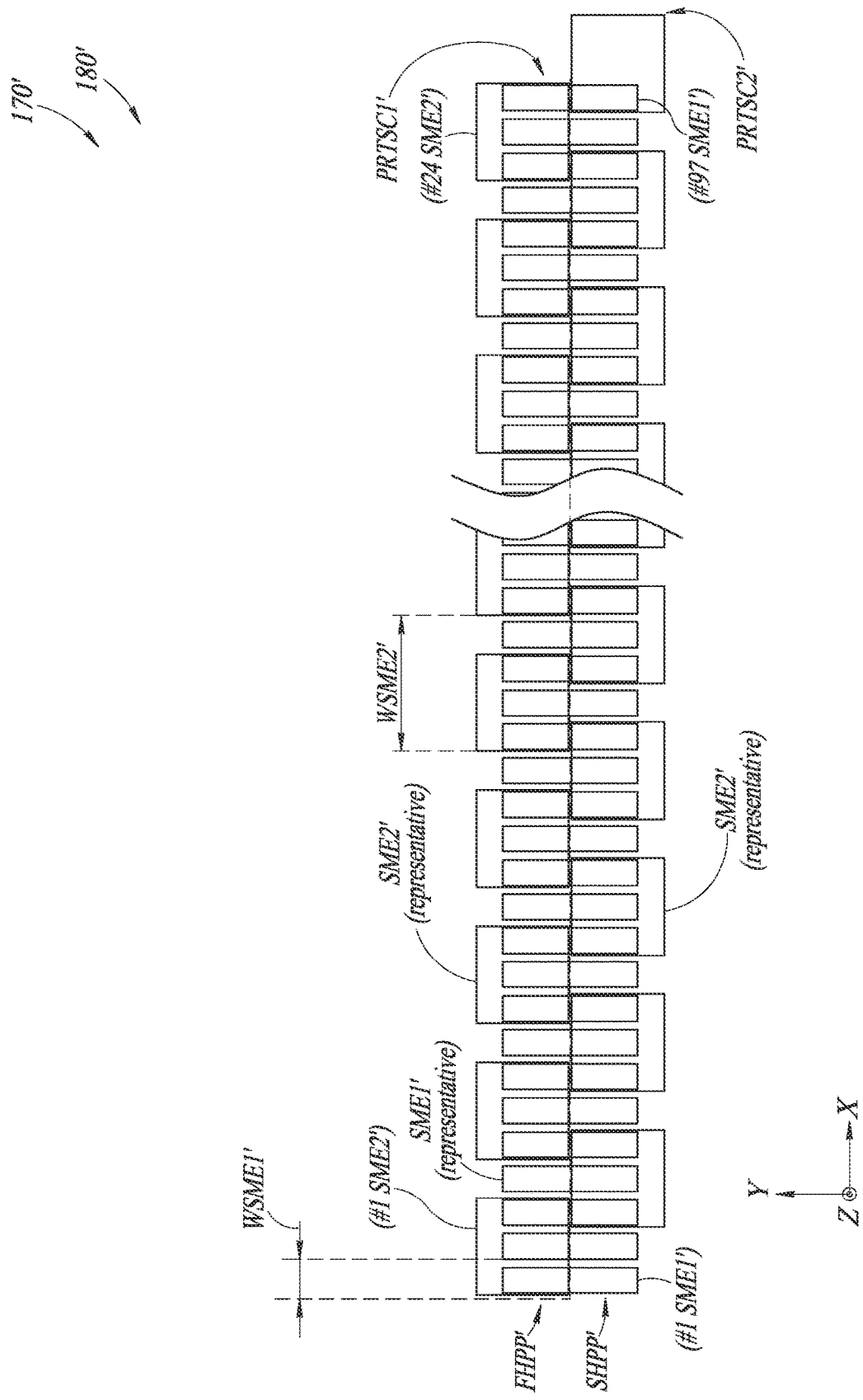
FIG. 12 is a diagram illustrating the first and second scale element portions of the transducer of FIG. 7.

As illustrated in FIG. 7 in additional reference to FIG. 12, the scale portion 170' includes the first and second scale element portions PRTSC1' and PRTSC2', which extend over an absolute range R' (i.e., as corresponding to an absolute wavelength WABS'). One technique for encoding an absolute (ABS) position into an encoder is to use two scale element portions with spatial wavelengths that satisfy certain relationships. For example, the following equation illustrates certain relationships that the spatial wavelengths WSME1' and WSME2' of the scale element portions PRTSC1' and PRTSC2' may satisfy:

$$n(WSME2') = (mn + 1)WSME1' \qquad \text{(Eq. 2)}$$

where m is an integer that is at least 2 and n is a positive number. This relationship is also noted to apply to other configurations as described herein (e.g., for the transducer TDR with the spatial wavelengths WSME1 and WSME2, etc.)

It is noted that in an alternative case where m=1, the equation simplifies to an expression that had been utilized in certain prior systems for encoding the absolute (ABS) position by using two encoder tracks (i.e., side-by-side) of slightly different spatial wavelengths. For any two spatial wavelengths that were very close, an ABS beat wavelength WABS was determined to be equal to the product of the spatial wavelengths as divided by the difference between the spatial wavelengths. A method for choosing the two spatial wavelengths was to set an integer number n of coarse wavelengths (e.g., WSME2) to be included in the absolute wavelength/range, and for which the other wavelength (e.g., WSME1) could be determined according to a relationship such as that indicated by a simplified version of EQUATION 2 (i.e., with m=1). Such aspects are described in more detail in U.S. Pat. No. 9,772,202, which is hereby incorporated herein by reference in its entirety. In accordance with the teachings of the '202 patent (e.g., such as could be applied to certain configurations as illustrated herein), in one implementation an absolute range R' (i.e., as corresponding to an absolute wavelength WABS') could be determined in accordance with WABS'=n(WSME2'). As an alternative, in accordance with implementations as illustrated herein, such may be determined in accordance with WABS'=n(WSME1').

In general, in contrast to prior techniques where the two spatial wavelengths were generally required to be very close, EQUATION 2 illustrates relationships where in certain implementations the second spatial wavelength WSME2' may be close to an integer multiple of the first spatial wavelength WSME1' (e.g., m(WSME1') may be close to equal to WSME2'). For example, in an implementation where n=24, m=4 and WSME2'=4.139 mm, then in accordance with EQUATION 2, WSME1'=1.024. This also corresponds to WSME2'=WSME1'((mn+1)/n)=4.042

(WSME1'). Certain aspects of this example are noted to correspond to one possible implementation of the configuration of FIG. 12, for which the number n of spatial wavelengths WSME2' included may be n=24 and the number (nm+1) of spatial wavelengths WSME1' included may be (nm+1)=97. Such values are illustrated by the #1 SME1' to #97 SME1' included in the first scale element portion PRTSC1', and the #1 SME2' to #24 SME2' included in the first half pattern portion FHPP' of the second scale element portions PRTSC2'. In accordance with EQUATION 2 and with m being an integer that is at least 2, in various implementations, the wavelength WSME2' will be approximately at least 2 times the wavelength WSME1', and in this particular example, is approximately at least 4 times the wavelength WSME1'.

In various implementations, certain similar characteristics of a transducer are achievable utilizing an equation similar to that of EQUATION 2 for determining the values of WSME1' and WSME2', except utilizing a "−1" factor rather than a "+1" factor, such as:

$$n(WSME2') = (mn - 1)WSME1' \qquad \text{(Eq. 3)}$$

where m is an integer that is at least 2 and n is a positive number. This EQUATION 3 is noted to be a possible alternative to EQUATION 2 (e.g., for indicating/determining certain relationships between first and second spatial wavelengths WSME1' and WSME2' for certain alternative configurations). In an example with n=24, m=4, and utilizing the relationships indicated by EQUATION 3, in one example configuration such could correspond to a configuration with n=24 SME2's in each row of a second scale element portion, and (mn−1)=95 SME1's in a first scale element portion.

It is noted that such relationships for a configuration (e.g., in accordance with EQUATION 2 or EQUATION 3), corresponds to a relatively large difference between the wavelengths WSME1' and WSME2' (e.g., where the wavelength WSME2' is close to being an integer multiple (e.g., m=4) of WSME1'). As described above with respect to FIG. 5, such large relative differences in the wavelengths WSME1' and WSME2' may correspond to relatively large differences in the "sensing distances" of the different corresponding transducer portions (e.g., in accordance with EQUATION 1). As noted above, such differences enable the transducers TDR and TDR' to be configured and operate with single track configurations (STCs), such as STCs in which the detector signals of the first transducer portion primarily result from interactions with the relatively closer first scale element portion, as opposed to the relatively further second scale element portion which may generally be out of the primary sensing range of the first transducer portion.

More specifically, as described above with respect to FIG. 5, the utilization of the longer wavelength WSME2' (e.g., that is at least 2 times the wavelength WSME1') corresponds to a longer sensing range for the transducer portion utilizing the wavelength WSME2', while the transducer portion utilizing the wavelength WSME1' corresponds to a shorter sensing range. Such characteristics (e.g., in relation to the gap distances of FIG. 5 as applied to the corresponding components of the transducer TDR') enable the second scale element portion PRTSC2' to be at a gap distance GAPD2 from the second sensing element portion PRTSEN2' that is within the primary range of the second sensing portion PRTSEN2', but out of the primary sensing range of the first sensing element portion PRTSEN1' (i.e., in accordance with the gap distance GAPD3). Thus, the first sensing element portion PRTSEN1' only primarily senses the first scale element portion PRTSC1' (e.g., which is within the shorter primary sensing range), as opposed to the second scale element portion PRTSC2' (e.g., which is outside of the shorter primary sensing range of the first sensing element portion PRTSEN1').

In various implementations, configurations may be formed in accordance with m=2, 3, 4, 5, etc. (e.g., in accordance with EQUATION 2, etc.) In various implementations, a configuration such as that as illustrated in FIGS. 7-12 (e.g., with m=4) may have certain advantages, as described herein. For example, as described above with respect to FIG. 9, in certain configurations, an implementation with m=4 may cause the first scale elements SME1' of the first scale element portion PRTSC1' to be at the fourth harmonic, thus making the first scale element portion PRTSC1' relatively undetectable to the second sensing element portion PRTSEN2' (e.g., which utilizes a four spatial phase configuration which may naturally filter out fourth harmonics).

Figure 13:
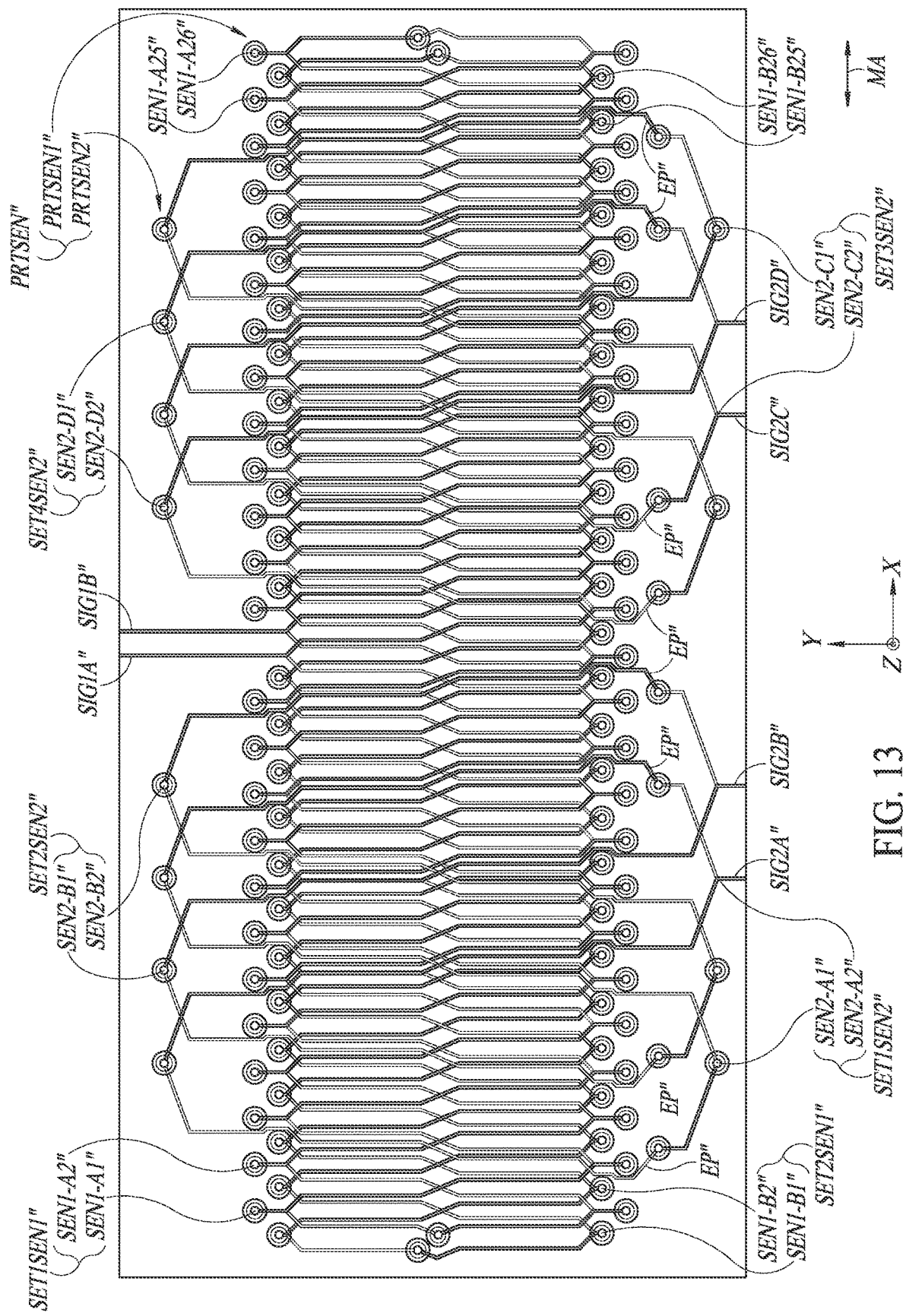
FIG. 13 is a diagram illustrating a sensing portion as may be included in a third implementation of a transducer such as may be utilized in the position encoder of FIG. 1.

FIG. 13 is a diagram illustrating a sensing portion PRTSEN" as may be included in a third implementation of a transducer such as may be utilized in the position encoder of FIG. 1. The sensing portion PRTSEN" includes first and second sensing element portions PRTSEN1" and PRTSEN2" (e.g., which perform similar functions as the first and second sensing element portions PRTSEN1' and PRTSEN2' as described above with respect to the configuration of FIG. 7). In the illustrated configuration of FIG. 13, the first and second sensing element portions PRTSEN1" and PRTSEN2" (i.e., including their corresponding sets of sensing elements) are interleaved relative to one another. This configuration enables the first and second sensing element portions PRTSEN1" and PRTSEN2" to be included in a total of two layers (e.g., see FIG. 14) as opposed to four layers (e.g., see FIG. 6A).

In various implementations, such characteristics may be achieved by having the circuit traces of the second sensing elements SEN2" of the second sensing element portion PRTSEN2" be positioned, shaped, etc. so as to fit between, or otherwise not overlap on a same layer with, the circuit traces of the first sensors SEN1" of the first sensing element portion PRTSEN1". In some implementations, extended portions EP" may be included for enabling the position of the circuit traces of the second sensing elements SEN2" to be between, or otherwise not overlap on a same layer with, the circuit traces of the first sensing elements SEN1".

The first sensing element portion PRTSEN1" includes the first set of first sensing elements SET1SEN1" and the second set of first sensing elements SET2SEN1". In the illustrated implementation, the first set of first sensing elements SET1SEN1" includes twenty-six first sensing elements SEN1" (i.e., including first sensing elements SEN1-A1" to SEN1-A26"), and the second set of first sensing elements SET2SEN1" includes twenty-six first sensing elements SEN1" (i.e., including first sensing elements SEN1-B1" to SEN1-B26").

The second sensing element portion PRTSEN2" includes the first, second, third and fourth sets of second sensing elements SET1SEN2", SET2SEN2", SET3SEN2" and SET4SEN2", respectively. In the illustrated implementation, each set of second sensing elements includes two second sensing elements. More specifically the first set of second sensing elements SET1SEN2" includes second sensing elements SEN2-A1" and SEN2-A2". The second set of second sensing elements SET2SEN2" includes second sensing elements SEN2-B1" and SEN2-B2". The third set of second sensing elements SET3SEN2" includes second sensing elements SEN2-C1" and SEN2-C2". The fourth set of second sensing elements SET4SEN2" includes second sensing elements SEN2-D1" and SEN2-D2".

Figure 14:
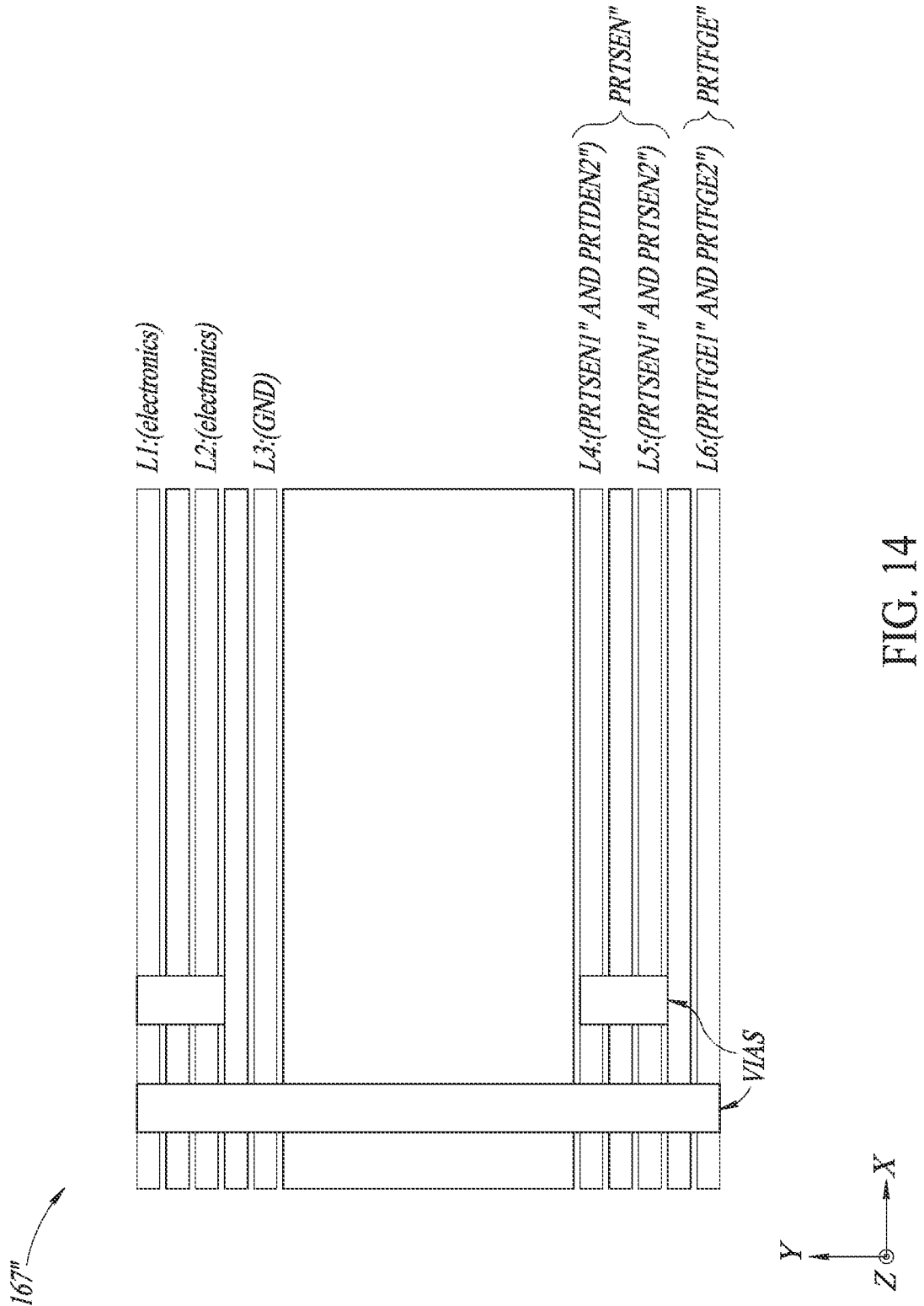
FIG. 14 is a diagram of an end view illustrating components of a detector portion of the third implementation of the transducer as located on substrates and as including the sensing portion of FIG. 13.

FIG. 14 is a diagram of an end view illustrating components of a detector portion 167" of the third implementation of the transducer as located on substrates and as including the first and second sensing element portions PRTSEN1" and PRTSEN2" of the sensing portion PRTSEN" of FIG. 13. As illustrated in FIG. 14, the configuration of FIG. 13 may be implemented in a six layer PCB configuration (i.e., for which each of the labeled layers L1-L6 is an electrical layer, and the layers between the labeled electrical layers are insulation layers), in accordance with the interleaving (e.g., interweaving) of the circuit traces of the second sensing element portion PRTSEN2" with the circuit traces of the first sensing element portion PRTSEN1". In certain implementations, a slight increase in a corresponding first signal modulating element wavelength (e.g., WSEN1") may be required, in order to achieve such implementations (e.g., for providing a required spacing to achieve the interleaving of the circuit traces).

In various implementations, a six layer PCB implementation as illustrated in FIG. 14 may be relatively less expensive than an implementation with more layers (e.g., a ten layer PCB, or an eight layer PCB, etc., such as described above with respect to FIG. 6A), and may also have a relatively smaller dimension (e.g., along the z-axis dimension). However, in various implementations, the configurations of FIGS. 3 and 7 may have certain advantages (e.g., with greater flexibility for the layout of the second sensing element portion PRTSEN2 without requiring dimensional characteristics of the circuit traces for interleaving, in addition to a potential for a slightly smaller wavelength WSEN1 for the first sensing element portion PRTSEN1, etc.). For a particular application, a configuration may be selected and utilized based on a desired tradeoff between these and/or other characteristics.

In each of the example transducer configurations of FIGS. 3-14 as described above, it will be appreciated that various aspects may enable the components of the different transducer portions (e.g., PRTTDR1 and PRTTDR2, PRTTDR1' and PRTTDR2', etc.) to operate without significantly affecting each other (e.g., without significantly affecting the detector signals that are produced by each respective transducer portion and which in combination indicate an absolute position). In various implementations, some of those aspects include differences between the spatial wavelengths that are utilized in each transducer portion along with different gaps between the sensing element portions and the scale element portions. Some other aspects include other differences between the second transducer portion and the first transducer portion, such as different sensor configurations (e.g., utilizing 4 phases versus 2 phases), different field generating configurations (e.g., utilizing 2 field generating loops with opposite polarities versus using a single field generating loop), and different scale configurations (e.g., utilizing two rows of signal modulating elements with a spatial offset as each corresponding to a half pattern versus using a single row of signal modulating elements as part of a corresponding pattern). As described above, such differences may help ensure that the effects of components in one transducer portion (e.g., the induced magnetic field effects caused by a scale element portion of one transducer portion) may nominally self-cancel or otherwise be minimized in regard to the operations (e.g., in regard to the detector signals that are correspondingly produced) of the other transducer portion (e.g., which may also be characterized as reducing cross-talk, such as scale element portion cross-talk, between the different transducer portions).

Figure 15:
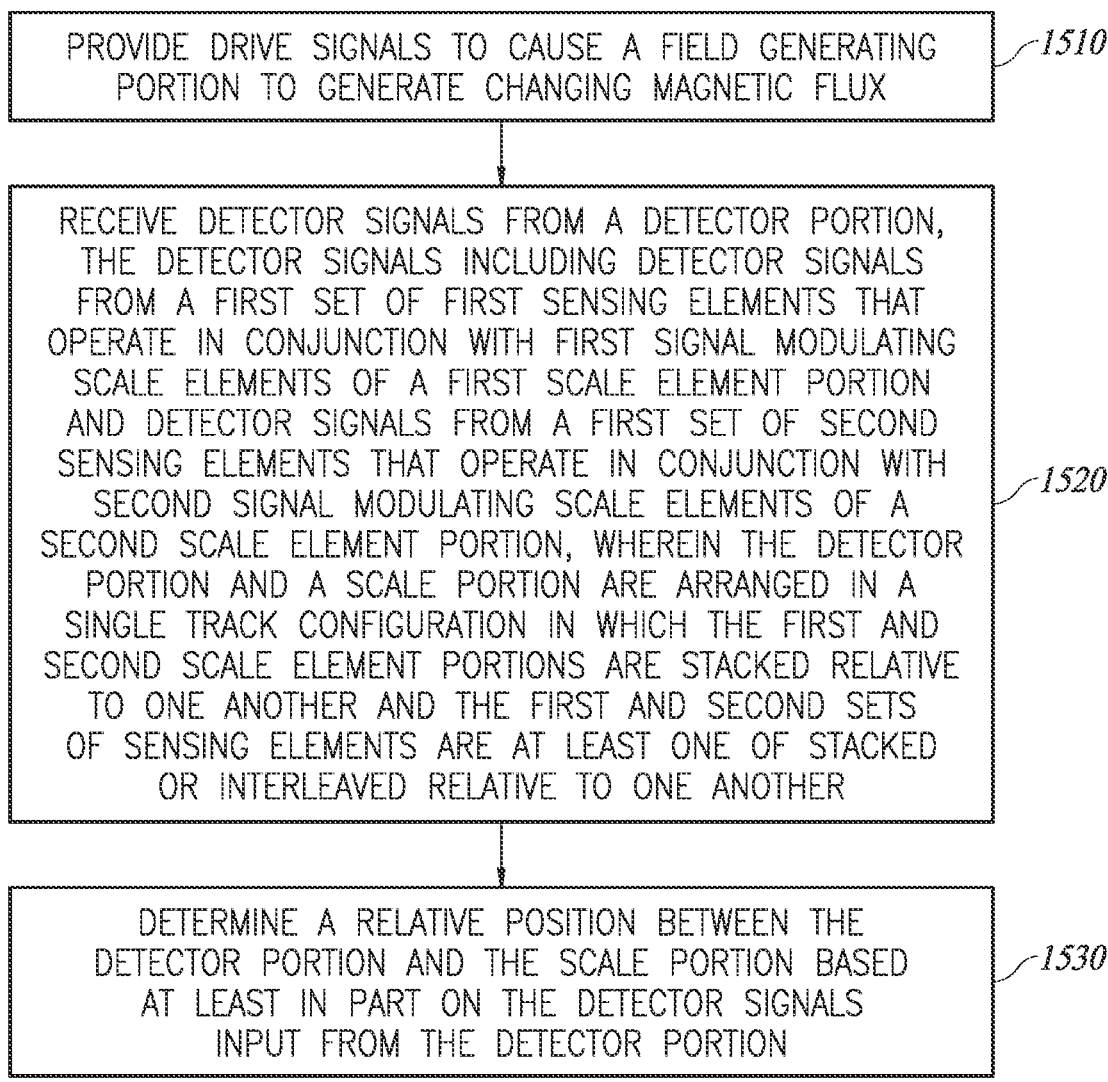
FIG. 15 is a flow diagram illustrating a method for operating an absolute electronic position encoder utilizing a single track configuration.

FIG. 15 is a flow diagram illustrating a method 1500 for operating an electronic position encoder utilizing a single track configuration. Any of the implementations described above with respect to FIGS. 1-14 or modifications thereof may be used to configure the position encoder. For purposes of example, certain reference/part numbers from FIG. 7 are included in parenthesis in the description below, although it will be appreciated that the description is intended to similarly apply to the corresponding reference/part numbers from the configurations of FIGS. 3 and 13, etc.

In block 1510, drive signals are provided to cause a field generating portion (PRTFGE') to generate changing magnetic flux. In block 1520, detector signals are received from the detector portion (167'), wherein the detector signals comprise: detector signals from the first set of first sensing elements (SET1SEN1') that operate in conjunction with first signal modulating elements (SME1'); and detector signals from the first set of second sensing elements (SET1SEN2') that operate in conjunction with second signal modulating elements (SME2'), wherein the detector portion (167') and the scale portion (170') are arranged in a single track configuration (STC') in which the first and second scale element portions are stacked relative to one another and the first and second sensing element portions are at least one of stacked or interleaved relative to one another. In block 1530, a relative position is determined between the detector portion (167') and the scale portion (170') based at least in part on the detector signals input from the detector portion (167').

In relation to the operations at the block 1530 for determining a relative position between the detector portion (167') and the scale portion (170') based at least in part on the detector signals from the detector portion, various processing and/or signal combining techniques may be utilized (e.g., as will be understood by one skilled in the art and at least in part in accordance with the teachings in the incorporated references'). Briefly, in various implementations two drive operations may be utilized for producing and processing the signals from the detector portion.

More specifically, as part of a first drive operation, the first field generating element portion PRTFGE1' may be driven (e.g., with corresponding drive signals from the signal processing configuration 166). As the first field generating element portion PRTFGE1' is driven, corresponding signals (e.g., signals SIG1A' and SIG1B') from the first sensing elements SEN1' of the first sensing element portion PRTSEN1' of the detector portion may be read (e.g., received, processed, etc.). As part of a second drive operation, the second field generating element portion PRTFGE2' may be driven (e.g., with corresponding drive signals from the signal processing configuration 166). As the second field generating element portion PRTFGE2' is driven, corresponding signals (e.g., signals SIG2A', SIG2B', SIG2C', and SIG2D') from the second sensing elements SEN2' of the second sensing element portion PRTSEN2' of the detector portion may be read (e.g., received, processed, etc.). The detector signals (i.e., from the detector portion) produced during the first and second drive operations may be utilized to determine a relative position (e.g., an absolute position between the detector portion and the scale portion). In various implementations, the detector signals may include six signals (e.g., SIG1A', SIG1B', SIG2A', SIG2B', SIG2C', SIG2D') that may be utilized for determining the relative position, such as the signals SIG1A' and SIG1B' during the first drive operation, and the signals SIG2A', SIG2B', SIG2C', and SIG2D' during the second drive operation.

As illustrated and described above with respect to FIGS. 1-16, the term stacked as utilized herein indicates that the corresponding elements or portions, etc. are stacked relative to one another along a depth direction that is approximately normal to the scale layers and/or detector layers (e.g., along a z-axis direction, such as located in different layers). As an example, as a result of the above described configurations (e.g., in reference to a z-axis direction) the first scale element portion (e.g., PRTSC1') may be located between the second scale element portion (e.g., PRTSC2') and the detector portion (e.g., 167') which includes both the first sensing element portion (e.g., PRTSEN1') and the second sensing element portion (e.g., PRTSEN2'). It will be appreciated that the relatively longer spatial wavelength of the second scale element portion (e.g., PRTSC2') and the second sensing element portion (e.g., PRTSEN2') enable those second portions to be separated by a relatively larger distance (e.g., have a relatively larger gap between the second portions') and still maintain sufficient signal levels (e.g., of signals SIG2A', SIG2B', SIG2C', and SIG2D'). This is as compared to the separation distance (e.g., gap) between the first scale element portion (e.g., PRTSC1') and the first sensing element portion (e.g., PRTSEN1'), which in various implementations is relatively smaller in order to maintain sufficient signal levels (e.g., of signals SIG1A' and SIG1B').

In various implementations, the fact that the second scale element portion (e.g., PRTSC2') is at a relatively significant distance (e.g., with a relatively significant gap) from the first sensing element portion (e.g., PRTSEN1') may result in the signals (e.g., signals SIG1A and SIG1B') being relatively less affected (e.g., being relatively unaffected) by the further second scale element portion (e.g., PRTSC2'). Alternatively or in addition, the first sensing elements (e.g., SEN1') of the first sensing element portion (e.g., PRTSEN1') may be configured (e.g., such as in illustrated implementations herein), such that the magnetic field signal modulations caused by the second scale element portion (e.g., PRTSC2') may be substantially common-mode to the first sensing elements (e.g., SEN1', which may be configured as twisted pairs) of the first sensing element portion (e.g., PRTSEN1'), such that the signals (e.g., signals SIG1A' and SIG1B') are relatively unaffected by the second scale element portion (e.g., PRTSC2'), and are only substantially affected by the first scale element portion (e.g., PRTSC1').

Similarly, the second sensing elements (e.g., SEN2') of the second sensing element portion (e.g., PRTSEN2') may be configured (e.g., such as in illustrated implementations herein), such that the signals (e.g., signals SIG2A', SIG2B', SIG2C' and SIG2D') are relatively unaffected by the first scale element portion (e.g., PRTSC1'), and are only substantially affected by the second scale element portion (e.g., PRTSC2'). As one example, as described above the second field generating element portion (e.g., PRTFGE2') may be configured and operated with two opposite polarity loops (e.g., loops FGE2FHL' and FGE2SHL'), for which the effects of each first signal modulating element (e.g., SME1') which have equal portions aligned with each of the loops may effectively cancel with regard to the overall effect on the detector signals (e.g., SIG2A', SIG2B', SIG2C', and SIG2D'). As another example, in certain implementations the utilization of a four phase layout with respect to the second sensing element portion (e.g., as producing the four phase signals SIG2A', SIG2B', SIG2C' and SIG2D') may naturally filter out 4th harmonics, for which if the first signal modulating elements (e.g., SME1') of the first scale element portion (e.g., PRTSC1') are of a size that approximately corresponds to the 4th harmonic (e.g., with m=4 such as described herein), the effects of the first signal modulating elements (e.g., SME1') of the first scale element portion (e.g., PRTSC1') may effectively be filtered out by the second sensing element portion such that the signals (e.g., signals SIG2A', SIG2B', SIG2C' and SIG2D') are only substantially effected by the second scale element portion (e.g., PRTSC2'). In general, in accordance with principles as disclosed herein, the utilization of first portions (e.g., PRTSC1 and PRTSEN1') and second portions (e.g., PRTSC2 and PRTSEN2') with certain different characteristics (e.g., different wavelengths, types of scale patterns, sensor techniques, field generating techniques, etc.) may result in the signals of the first portions (e.g., signals SIG1A' and SIG1B') being relatively unaffected by the second portions (e.g., PRTSC2'), and the signals of the second portions (e.g., signals SIG2A', SIG2B', SIG2C' and SIG2D') being relatively unaffected by the first portions (e.g., PRTSC1').

Such characteristics enable the single track configuration (e.g., STC') to be formed and to be operable in which the first and second scale element portions (e.g., PRTSC1' and PRTSC2') are stacked relative to one another and the first and second sensing element portions (PRTSEN1' and PRTSEN2') are at least one of stacked or interleaved relative to one another (e.g., with the first scale element portion (e.g., PRTSC1') located between the second scale element portion (e.g., PRTSC2') and the detector portion (e.g., 167, and corresponding portions thereof). As noted above, in accordance with this configuration, the second scale element portion (e.g., PRTSC2') is at a longer distance (e.g., gap) from the second sensing element portion (e.g., PRTSEN2'), as compared to the distance (e.g., gap) between the first scale element portion (e.g., PRTSC1') and the first sensing element portion (e.g., PRTSEN1'), as enabled by the utilization of the second portions with a relatively longer spatial wavelength (e.g., WSME2') as compared to the utilization in the first portions with a relatively shorter wavelength (e.g., WSME1'). In various implementations, it may be desirable for the relatively longer spatial wavelength to be at least twice the length of the relatively smaller spatial wavelength (e.g., as according to formula such as WSME2'=WSME1'((mn+1)/n)) or WSME2'=WSME1'((mn−1)/n)), where m is an integer that is at least 2, and n is a positive number). As illustrated in certain examples herein, in some implementations the relatively longer spatial wavelength (e.g., WSME2') may be at least three or four times the length of the relatively smaller spatial wavelength (e.g., WSME1'), in order to achieve a configuration with certain desirable characteristics for a given application.

It will be appreciated that the principles disclosed and claimed herein may be readily and desirably combined with various features disclosed in the incorporated references. The various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. An electronic position encoder configured to measure an absolute relative position between a detector portion and a scale portion along a measuring axis direction, the electronic position encoder comprising:
   a scale portion extending along the measuring axis direction which corresponds to an x-axis direction, the scale portion comprising:
      a first scale element portion comprising first signal modulating scale elements; and
      a second scale element portion comprising second signal modulating scale elements;
   a detector portion configured to be mounted proximate to the scale portion and to move relative to the scale portion along the measuring axis direction in a plane that extends along the x-axis direction and a y-axis direction, with a z-axis direction being orthogonal to the plane, the detector portion comprising:
      a field generating portion configured to generate changing magnetic flux in response to drive signals, the field generating portion comprising a first field generating element portion, which includes elongated portions and end portions which in combination form a first field generating element loop with an interior area, wherein the elongated portions extend along the x-axis direction, and the end portions extend along the y-axis direction which is perpendicular to the x-axis direction; and
      a sensing portion comprising:
         a first sensing element portion comprising a first set of first sensing elements configured to operate in conjunction with first signal modulating scale elements of the first scale element portion; and
         a second sensing element portion comprising a first set of second sensing elements configured to operate in conjunction with second signal modulating scale elements of the second scale element portion;
      wherein the detector portion and the scale portion are arranged in a single track configuration in which the first scale element portion is included in a first scale layer and the second scale element portion is included in a second scale layer, and the first and second scale element portions are stacked relative to one another along the z-axis direction that is approximately normal to the scale layers and the first and second sensing element portions are at least one of stacked or interleaved relative to one another.

2. The electronic position encoder of claim 1, further comprising a signal processing configuration that is operably connected to the detector portion to provide the drive signals and that is configured to determine a relative position between the detector portion and the scale portion based at least in part on detector signals input from the detector portion, the detector signals including detector signals from the first set of first sensing elements and detector signals from the first set of second sensing elements.

3. The electronic position encoder of claim 1, wherein in accordance with the single track configuration in which the first and second scale element portions are stacked relative to one another, the first and second scale element portions are at different distances from the first sensing element portion along the z-axis direction that is approximately normal to the scale layers.

4. The electronic position encoder of claim 1, wherein:
the first signal modulating scale elements of the first scale element portion are arranged along the measuring axis direction in a first scale element pattern; and
the second signal modulating scale elements of the second scale element portion are arranged along the measuring axis direction in a second scale element pattern.

5. The electronic position encoder of claim 4, wherein:
the operating of the first set of first sensing elements in conjunction with first signal modulating scale elements of the first scale element portion includes the first set of first sensing elements providing detector signals which respond to a local effect on a changing magnetic flux provided by first signal modulating scale elements of the first scale element portion; and
the operating of the first set of second sensing elements in conjunction with second signal modulating scale elements of the second scale element portion includes the first set of second sensing elements providing detector signals which respond to a local effect on a changing magnetic flux provided by second signal modulating scale elements of the second scale element portion.

6. The electronic position encoder of claim 4, wherein:
the first set of first sensing elements are disposed along the measuring axis direction according to a first sensing element spatial wavelength; and
the first set of second sensing elements are disposed along the measuring axis direction according to a second sensing element spatial wavelength that is different than the first sensing element spatial wavelength.

7. The electronic position encoder of claim 6, wherein a first gap distance between the first sensing element portion and the first scale element portion is smaller than a second gap distance between the second sensing element portion and the second scale element portion.

8. The electronic position encoder of claim 7, wherein a spatial wavelength of the second scale element portion is at least twice as long as spatial wavelength of the first scale element portion.

9. The electronic position encoder of claim 4, wherein the first and second scale element patterns define a corresponding absolute range R along the measuring axis direction MA, the second scale element pattern having a spatial wavelength WSME2, and the first scale element pattern having a spatial wavelength WSME1, wherein n*WSME2 is equal to either (mn+1)WSME1 or (mn−1)WSME1, for which n is a positive number and m is an integer that is at least 2.

10. The electronic position encoder of claim 1, wherein:
the first sensing elements each have a first maximum width dimension along the measuring axis direction; and
the second sensing elements each have a second maximum width dimension along the measuring axis direction that is different than the first maximum width dimension.

11. The electronic position encoder of claim 1, wherein:
the first sensing element portion further comprises one or more additional sets of first sensing elements, for which each additional set of first sensing elements has a spatial phase offset relative to the first set of first sensing elements; and
the second sensing element portion further comprises one or more additional sets of second sensing elements, for which each additional set of second sensing elements has a spatial phase offset relative to the first set of second sensing elements.

12. The electronic position encoder of claim 11, wherein the number of additional sets of first sensing elements is different than the number of additional sets of second sensing elements.

13. The electronic position encoder of claim 11, wherein the number of additional sets of second sensing elements is at least one greater than the number of additional sets of first sensing elements.

14. The electronic position encoder of claim 13, wherein the number of additional sets of second sensing elements is three which are included as part of a four phase configuration of the second sensing element portion.

15. The electronic position encoder of claim 1, wherein the first and second signal modulating scale elements comprise conductive plates.

16. The electronic position encoder of claim 1, wherein the first and second sensing elements comprise conductive loops.

17. The electronic position encoder of claim 1, wherein the first and second sensing element portions are stacked relative to one another as part of the single track configuration, and for which the first and second sensing element portions are correspondingly at different distances from the first scale element portion.

18. The electronic position encoder of claim 1, wherein the field generating portion comprises:
the first field generating element portion configured to operate in conjunction with the first sensing element portion and with first signal modulating scale elements of the first scale element portion, the first field generating element portion comprising the first field generating element loop with the interior area that is configured to be aligned with the first sensing element portion and the first scale element portion; and
a second field generating element portion configured to operate in conjunction with the second sensing element portion and with second signal modulating scale elements of the second scale element portion, the second field generating element portion comprising:
a second field generating element first half loop with an interior area that is configured to be aligned with a first half pattern portion of the second scale element portion; and
a second field generating element second half loop with an interior area that is configured to be aligned with a second half pattern portion of the second scale element portion, wherein the second field generating element first half loop and the second field generating element second half loop are configured to have current flows in opposite directions around the respective loops.

19. A method for operating an electronic position encoder configured to measure an absolute relative position between a detector portion and a scale portion along a measuring axis direction,
the electronic position encoder comprising:
a scale portion extending along the measuring axis direction which corresponds to an x-axis direction, the scale portion comprising:
a first scale element portion comprising first signal modulating scale elements; and
a second scale element portion comprising second signal modulating scale elements;
a detector portion configured to be mounted proximate to the scale portion and to move relative to the scale portion along the measuring axis direction in a plane that extends along the x-axis direction and a y-axis direction, with a z-axis direction being orthogonal to the plane, the detector portion comprising:
a field generating portion configured to generate changing magnetic flux in response to drive signals, the field generating portion comprising a first field generating element portion, which includes elongated portions and end portions which in combination form a first field generating element loop with an interior area, wherein the elongated portions extend along the x-axis direction, and the end portions extend along the y-axis direction which is perpendicular to the x-axis direction; and
a sensing portion comprising:
a first sensing element portion comprising a first set of first sensing elements configured to operate in conjunction with first signal modulating scale elements of the first scale element portion; and
a second sensing element portion comprising a first set of second sensing elements configured to operate in conjunction with second signal modulating scale elements of the second scale element portion;
the method comprising:
providing drive signals to cause the field generating portion to generate changing magnetic flux; and
receiving detector signals from the detector portion, the detector signals comprising:
detector signals from the first set of first sensing elements that operate in conjunction with first signal modulating scale elements; and
detector signals from the first set of second sensing elements that operate in conjunction with second signal modulating scale elements,
wherein the detector portion and the scale portion are arranged in a single track configuration in which the first scale element portion is included in a first scale layer and the second scale element portion is included in a second scale layer, and the first and second scale element portions are stacked relative to one another along the z-axis direction that is approximately normal to the scale layers and the first and second sensing element portions are at least one of stacked or interleaved relative to one another.

20. The method of claim 19, further comprising determining a relative position between the detector portion and the scale portion based at least in part on the detector signals input from the detector portion.

21. The method of claim 19, wherein:
the operating of the first set of first sensing elements in conjunction with first signal modulating scale elements includes the first set of first sensing elements providing detector signals which respond to a local effect on a changing magnetic flux provided by first signal modulating scale elements of the first scale element portion; and
the operating of the first set of second sensing elements in conjunction with second signal modulating scale elements includes the first set of second sensing elements providing detector signals which respond to a local effect on a changing magnetic flux provided by second signal modulating scale elements of the second scale element portion.

22. A system configured to measure an absolute relative position between a detector portion and a scale portion along a measuring axis direction, the system comprising:
a scale portion extending along the measuring axis direction which corresponds to an x-axis direction, the scale portion comprising:
a first scale element portion comprising first signal modulating scale elements; and
a second scale element portion comprising second signal modulating scale elements;
a detector portion configured to be mounted proximate to the scale portion and to move relative to the scale portion along the measuring axis direction in a plane that extends along the x-axis direction and a y-axis direction, with a z-axis direction being orthogonal to the plane, the detector portion comprising:
a field generating portion configured to generate changing magnetic flux in response to drive signals, the field generating portion comprising a first field generating element portion, which includes elongated portions and end portions which in combination form a first field generating element loop with an interior area, wherein the elongated portions extend along the x-axis direction, and the end portions extend along the y-axis direction which is perpendicular to the x-axis direction; and
a sensing portion comprising:
a first sensing element portion comprising a first set of first sensing elements configured to operate in conjunction with first signal modulating scale elements of the first scale element portion; and
a second sensing element portion comprising a first set of second sensing elements configured to operate in conjunction with second signal modulating scale elements of the second scale element portion;
wherein:
the detector portion and the scale portion are arranged in a single track configuration in which the first scale element portion is included in a first scale layer and the second scale element portion is included in a second scale layer, and the first and second scale element portions are stacked relative to one another along the z-axis direction that is approximately normal to the scale layers and the first and second sensing element portions are at least one of stacked or interleaved relative to one another; and
the system is configured to:
provide drive signals to cause the field generating portion to generate changing magnetic flux; and
receive detector signals from the detector portion, the detector signals including:
detector signals from the first set of first sensing elements that operate in conjunction with first signal modulating scale elements; and
detector signals from the first set of second sensing elements that operate in conjunction with second signal modulating scale elements.

23. The electronic position encoder of claim 1, wherein in accordance with the single track configuration in which the first and second scale element portions are stacked relative to one another along the z-axis direction that is approximately normal to the scale layers, the first scale element portion is located between the second scale element portion and the detector portion along the z-axis direction.

* * * * *